(12) United States Patent
Elsakhawy

(10) Patent No.: US 12,538,135 B2
(45) Date of Patent: Jan. 27, 2026

(54) SYSTEM AND METHOD FOR MANAGING QUALITY INFORMATION OF MULTIPLE NETWORKS

(71) Applicant: Rakuten Mobile, Inc., Tokyo (JP)

(72) Inventor: Mahmoud Mohamed Elsakhawy, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 360 days.

(21) Appl. No.: 18/189,279

(22) Filed: Mar. 24, 2023

(65) Prior Publication Data

US 2024/0323105 A1  Sep. 26, 2024

(51) Int. Cl.
| | | |
|---|---|---|
| *H04W 16/18* | (2009.01) | |
| *H04L 41/14* | (2022.01) | |
| *H04L 41/22* | (2022.01) | |
| *H04L 41/50* | (2022.01) | |
| *H04W 24/10* | (2009.01) | |

(52) U.S. Cl.
CPC ............ *H04W 16/18* (2013.01); *H04L 41/14* (2013.01); *H04L 41/22* (2013.01); *H04L 41/5032* (2013.01); *H04W 24/10* (2013.01)

(58) Field of Classification Search
CPC ...... H04W 16/18–20; H04W 24/06–10; H04L 41/14–149; H04L 41/22; H04L 41/503
See application file for complete search history.

(56) References Cited

U.S. PATENT DOCUMENTS

| | | | | |
|---|---|---|---|---|
| 6,516,189 B1* | 2/2003 | Frangione | ............ | H04W 24/00 |
| | | | | 455/2.01 |
| 7,392,017 B2* | 6/2008 | Chu | ............ | H04W 24/00 |
| | | | | 455/67.11 |
| 10,716,019 B1* | 7/2020 | Velusamy | ............ | H04W 24/06 |
| 11,070,990 B1* | 7/2021 | Pikle | ............ | H04L 41/5032 |
| 11,122,488 B1* | 9/2021 | Lloyd | ............ | H04W 24/02 |
| 2007/0004394 A1* | 1/2007 | Chu | ............ | H04W 24/08 |
| | | | | 455/422.1 |
| 2010/0091677 A1* | 4/2010 | Griff | ............ | H04L 43/06 |
| | | | | 370/252 |
| 2013/0132517 A1* | 5/2013 | Griff | ............ | G06F 3/04842 |
| | | | | 709/217 |
| 2017/0086084 A1* | 3/2017 | Jarvis | ............ | H04M 3/2236 |

\* cited by examiner

*Primary Examiner* — Brendan Y Higa
(74) *Attorney, Agent, or Firm* — Sughrue Mion, PLLC

(57) ABSTRACT

Provided are system, method, and device for managing quality information of multiple networks. According to embodiments, the system includes: a memory storage storing computer-executable instructions; and at least one processor communicatively coupled to the memory storage, wherein the at least one processor may be configured to execute the instructions to: collect, from a plurality of information resources, information associated with a plurality of networks; determine, based on the collected information, network quality of at least a portion of the plurality of networks; determine whether or not a condition associated with the network quality of the portion of the plurality of networks is satisfied; and based on determining that the condition is satisfied, output information associated with a location at which the condition is satisfied.

11 Claims, 14 Drawing Sheets

| KPI Parameter | Threshold | Quality Level |
|---|---|---|
| RSRP | => -95 | Excellent |
| | => -100 and <-95 | Good |
| | => -105 and <-100 | Fair |
| | => -110 and <-105 | Weak |
| | <- 110 | Very Poor |
| ... | ... | ... |
| Parameter N | Threshold A | Excellent |
| | Threshold B | Good |
| | Threshold C | Fair |
| | Threshold D | Weak |
| | Threshold E | Very Poor |

FIG. 4

| 1st Network | 2nd Network | 3rd Network | Condition |
|---|---|---|---|
| (Excellent) OR (Good) OR (Fair) | (Weak) OR (Poor) | ... | 1 |
| (Excellent) OR (Good) OR (Fair) | (Weak) OR (Poor) | (Weak) OR (Poor) | 2 |
| ... | ... | ... | ... |
| (Weak) OR (Poor) | (Excellent) OR (Good) OR (Fair) | ... | 3 |
| (Weak) OR (Poor) | (Excellent) OR (Good) OR (Fair) | (Excellent) OR (Good) OR (Fair) | 4 |

SYSTEM AND METHOD FOR MANAGING QUALITY INFORMATION OF MULTIPLE NETWORKS

TECHNICAL FIELD

Systems, methods, and devices consistent with example embodiments of the present disclosure relate to telecommunication networks, and more specifically, relate to managing network quality information of multiple telecommunication networks.

BACKGROUND

Network quality is one of the most critical parameters in a telecommunication network, from the perspective of both the network users and the network providers.

For the network users (e.g., the customers of the network providers), network quality may be the key factor for differentiating network providers, for choosing an appropriate network provider, for retaining a specific network provider, for switching to another network provider, or the like. For instance, individual network users tend to choose network provider(s) based on the ability of the network provider to provide reliable networks at a competitive service price. Conversely, enterprise network users may prefer a network provider which may provide safe, fast, and stable networks with a higher service price as compared to individual network users.

The network providers (e.g., network operator, virtual network operator, etc.) must ensure that the quality of the provided network and associated services satisfies or exceeds the quality of service (QoS) promised to the network users. Further, network quality is also one of the most important factors for the network providers to maintain market competitiveness, since network providers which are able to provide high network quality usually have higher average revenue per user (ARPU) and/or lower customers churn rate as compared to network providers which provide lower network quality. Thus, the network providers may need to continuously enhance and improve their network in order to remain competitive and to optimize customer experience.

In view of the above, it is important to enable the network providers and network users to obtain quality information of available networks in a fast, accurate, and comprehensive manner. Nevertheless, related art approaches for managing network quality information may be limited, inaccurate, and sub-optimal.

Typically, network planning and marketing activities are interrelated and are performed in a linear manner. For example, a marketing team of a network provider may develop users and usage forecasts, a technical team of the network provider may plan and build the network according to the developed forecasts, and the marketing team may develop marketing strategy (e.g., advertisement, campaign, etc.) based on the network statistics (e.g., coverage level, etc.) provided by the technical team.

In this regard, in the related art, the processes of information collection, analysis, correlation, or the like, are manually performed and may involve multiple parties. As a result, said processes may require significant amount of collaboration among different parties, and significant amount of data may be involved. Thus, the processes of managing network quality information in the related art are time-consuming, costly in terms of time and human resources, and may easily introduce errors.

Further, in the related art, network providers usually focus only on quality information of their own network(s), without taking into consideration quality information of networks provided by other network provider(s). This may leads to a situation in which different network providers may have different interpretations on network quality, and may result in several negative impacts such as making inaccurate marketing strategies and/or network planning strategies, causing confusion among the users, or the like.

By way of example, a first network provider may consider an associated network provided in an area with reference signal received power (RSRP) less than −100 as having "good" network quality, and may develop marketing strategies (e.g., advertisement slogan, promotion campaign, etc.) and/or network planning strategies (e.g., network enhancement plan, etc.) based on the opinion that the quality of the network provided in said area is "good". Nevertheless, there may be other network providers at the same area which may provide networks with higher RSRP (e.g., greater than −100), which in turn provides a better network performance and network quality as compared to the network provided by the first network operator. As a result, the marketing strategies and/or network planning strategies developed by the first network provider may not be effective.

On the other hand, in the related art, the network users may need to separately collect quality information of different network providers, and to manually analyze the collected information thereafter. In this regard, different network providers may provide the quality information of the associated network(s) in different manners (e.g., different formats, different detail levels, etc.), which may cause difficulty in comparing the network quality of a plurality of networks provided by different network providers. Furthermore, the network users may obtain inaccurate information (e.g., information provided by unauthorized resources, outdated information, etc.) which may mislead the network users in decision making (e.g., switching to another network provider, making a complaint to the current network provider, etc.).

SUMMARY

Systems, methods, devices, and the like, provided in the example embodiments of the present disclosure automatically collect information associated with a plurality of networks, automatically process the collected information to correlate the quality information of the plurality of networks, and automatically present the quality information to the associated user when required. Ultimately, the processes of managing quality information of multiple networks may be simplified, the associated cost may be significantly reduced, the efficiency of obtaining the required information may be improved, and potential human errors may be avoided.

According to embodiments, a system is provided. The system may include: a memory storage storing computer-executable instructions; and at least one processor communicatively coupled to the memory storage, wherein the at least one processor may be configured to execute the instructions to: collect, from a plurality of information resources, information associated with a plurality of networks; determine, based on the collected information, network quality of at least a portion of the plurality of networks; determine whether or not a condition associated with the network quality of the portion of the plurality of networks is satisfied;

and based on determining that the condition is satisfied, output information associated with a location at which the condition is satisfied.

According to embodiments, a method is provided. The method may be performed by at least one processor, and may include: collecting, from a plurality of information resources, information associated with a plurality of networks; determining, based on the collected information, network quality of at least a portion of the plurality of networks; determining whether or not a condition associated with the network quality of the portion of the plurality of networks is satisfied; and based on determining that the condition is satisfied, outputting information associated with a location at which the condition is satisfied.

According to embodiments, a non-transitory computer-readable recording medium is provided. The non-transitory computer-readable recording medium may have recorded thereon instructions executable by at least one processor to cause the at least one processor to perform a method including: collecting, from a plurality of information resources, information associated with a plurality of networks; determining, based on the collected information, network quality of at least a portion of the plurality of networks; determining whether or not a condition associated with the network quality of the portion of the plurality of networks is satisfied; and based on determining that the condition is satisfied, outputting information associated with a location at which the condition is satisfied.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 4 illustrates a table containing examples of predefined mappings of threshold values of KPI parameters and the respective quality level, according to one or more embodiments;

FIG. 5 illustrates a table containing examples of conditions and the associated requirements, according to one or more embodiments;

DETAILED DESCRIPTION

Figure 1A:
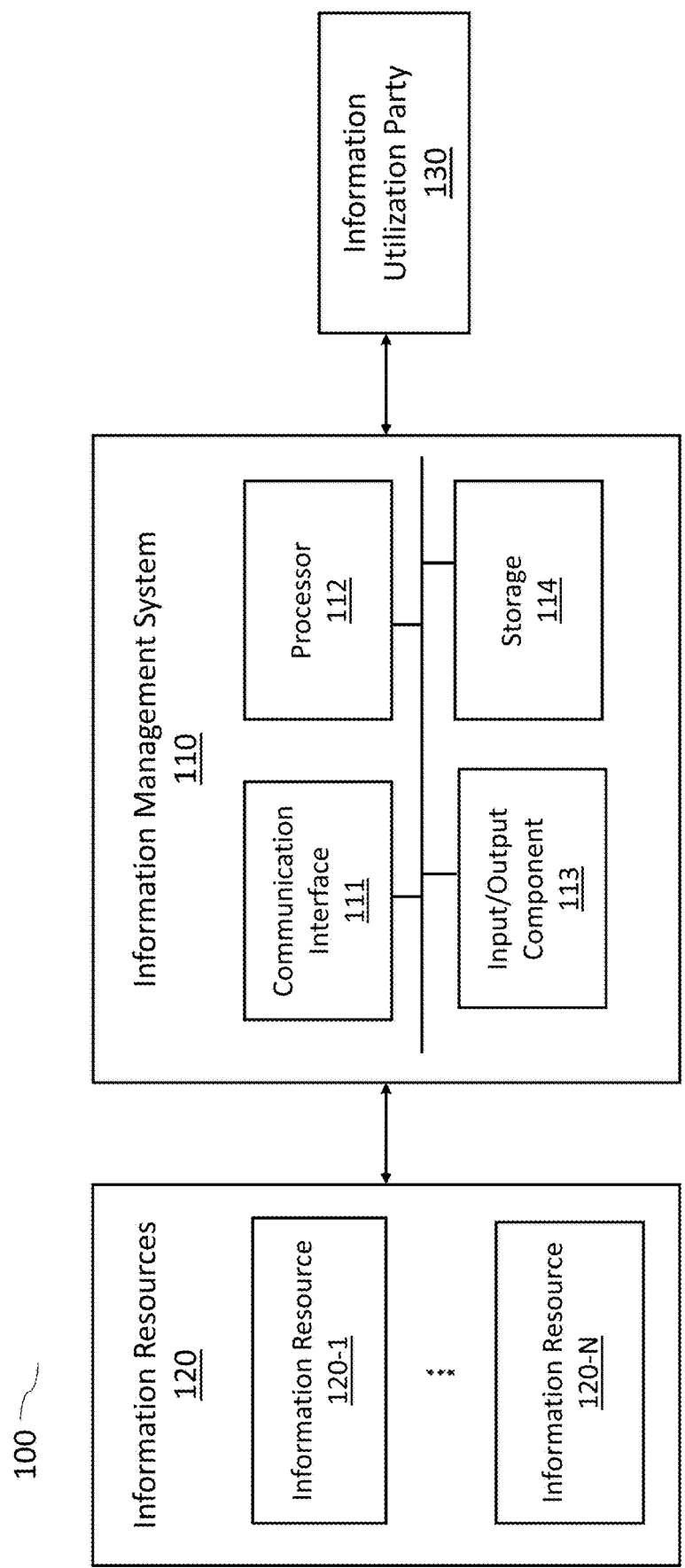
FIG. 1A illustrates a block diagram of an example system configuration for managing information of a plurality of networks, according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Systems, methods, devices, and the like, provided in the example embodiments of the present disclosure utilize an information management system which automatically collect information associated with a plurality of networks, automatically process the collected information to correlate the quality information of the plurality of networks, and automatically present the quality information to the user (e.g., network provider(s), network user(s), etc.) when required.

Ultimately, the processes of managing quality information of multiple networks may be simplified, the associated cost may be significantly reduced, the efficiency of obtaining the required information may be improved, and potential human errors may be avoided.

Further, since the quality information of multiple networks are taken into consideration, the quality information presented to the users are able to more accurately reflect the actual networks situation. Accordingly, the accuracy of strategies (e.g., marketing, network planning, etc.) constructed by the network providers may be improved, which in turn reduces customers churn rate, improves ARPU, and reduces cost of manual or additional surveys and researches. Similarly, the accuracy of decision making of the network users may be improved.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the information management system of the present disclosure, according to one or more embodiments, are provided in the following.

Example System Architecture

FIG. 1A illustrates a block diagram of an example system configuration 100 for managing information of a plurality of networks, according to one or more embodiments. Referring to FIG. 1A, system configuration 100 may include an information management system 110, a plurality of information resources 120, and at least one information utilization party 130.

In general, the information management system 110 may be configured to collect information of a plurality of networks from the plurality of information resources 120, to process the collected information to determine information associated with network quality (may be referred to as "quality information" herein) of the plurality of networks, and to output the quality information to the information utilization party 130 for further utilization when required.

According to example embodiments, the information management system 110 may include at least one communication interface 111, at least one processor 112, at least one input/output component 113, and at least one storage 114.

The communication interface 111 may include at least one transceiver-like component (e.g., a transceiver, a separate receiver and transmitter, a bus, etc.) that enables the components of information management system 110 to communicate with each other and to communicate with one or more components external to the information management system 110, such as via a wired connection, a wireless connection, or a combination of wired and wireless connections.

For instance, the communication interface 111 may couple the processor 112 to the storage 114 to thereby enable them to communicate and to interoperate with each other in performing one or more operations. As another example, communication interface 111 may couple the information management system 110 (or one or more components included therein) to one or more of the information resources 120, and/or to the information utilization party 130, so as to enable them to communicate and to interoperate with each other.

According to one or more embodiments, the communication interface 111 may include one or more application programming interfaces (APIs) which allow the information management system 110 (or one or more components included therein) to communicate with one or more software applications (e.g., software application deployed in the information resources 120, software application deployed in the information utilization party 130, etc.).

The input/output component 113 may include at least one component that permits the information management system 110 to receive information and/or to provide output information. It can be understood that, in some embodiments, the input/output component 113 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The processor 112 may include at least one processor capable of being programmed to perform a function(s) or an operation(s) described herein. For instance, the processor 112 may be configured to execute computer-readable instructions stored in at least one storage medium (e.g., storage 114, etc.) to thereby perform one or more actions or one or more operations described herein.

According to embodiments, the processor 112 may be configured to receive (e.g., via the communication interface 111, via the input/output component 113, etc.) one or more signals and/or one or more user inputs defining one or more instructions for performing one or more operations. Further, the processor 112 may be implemented in hardware, firmware, or a combination of hardware and software. For instance, processor 112 may be at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 112 may be configured to collect, to extract, and/or to receive one or more information from the plurality of information resources 120, to process the received one or more information to determine quality information of a plurality of networks, and to output the quality information (e.g., to the information utilization party 130).

According to embodiments, the processor 112 may output the quality information by generating and presenting one or more graphical user interfaces (GUIs) comprising the quality information of the plurality of networks. For instance, the one or more GUIs may include a map with one or more icons plotted thereon, wherein each of the icons may represent a location at which a condition associated with the quality information of the plurality of networks is satisfied. Descriptions of several example operations which may be performed by the processor 112 are provided below with reference to FIG. 2 to FIG. 6, and descriptions of several example GUIs which may be generated and presented by the processor 112 are provided below with reference to FIG. 7 to FIG. 9D.

The storage 114 may include one or more storage mediums suitable for storing data, information, and/or computer-executable instructions therein. According to embodiments, the storage 114 may include at least one of a random access memory (RAM), a read only memory (ROM), and/or another type of dynamic or static storage device (e.g., a flash memory, a magnetic memory, and/or an optical memory)

that stores information and/or instructions for use by the processor 114. Additionally or alternatively, the storage 114 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 114 may be configured to store information, such as raw data, metadata, or the like, obtained from one or more of the plurality of information resources 120. Additionally or alternatively, the storage 114 may be configured to store one or more information processed by the processor 112. For instance, the storage 114 may store one or more quality information determined by the processor 112, one or more maps plotted by the processor 112, one or more GUIs generated by the processor 112, or the like.

Further, the storage 114 may store data or information required in identifying the quality information. For instance, the storage 114 may store predefined mappings of threshold values of network key performance indicator (KPI) parameters and the respective quality level (further described below with reference to FIG. 4), may store information associated with network conditions (further described below with reference to FIG. 5), may store information associated with the users (e.g., user search history, etc.), and/or the like.

In some implementation, the storage 114 may include a plurality of storage mediums located at different locations, and the storage 114 may be configured to store a duplicate or a copy of at least a portion of the information in the plurality of storage mediums, for providing redundancy and for backing-up the information or the associated data.

Figure 1B:
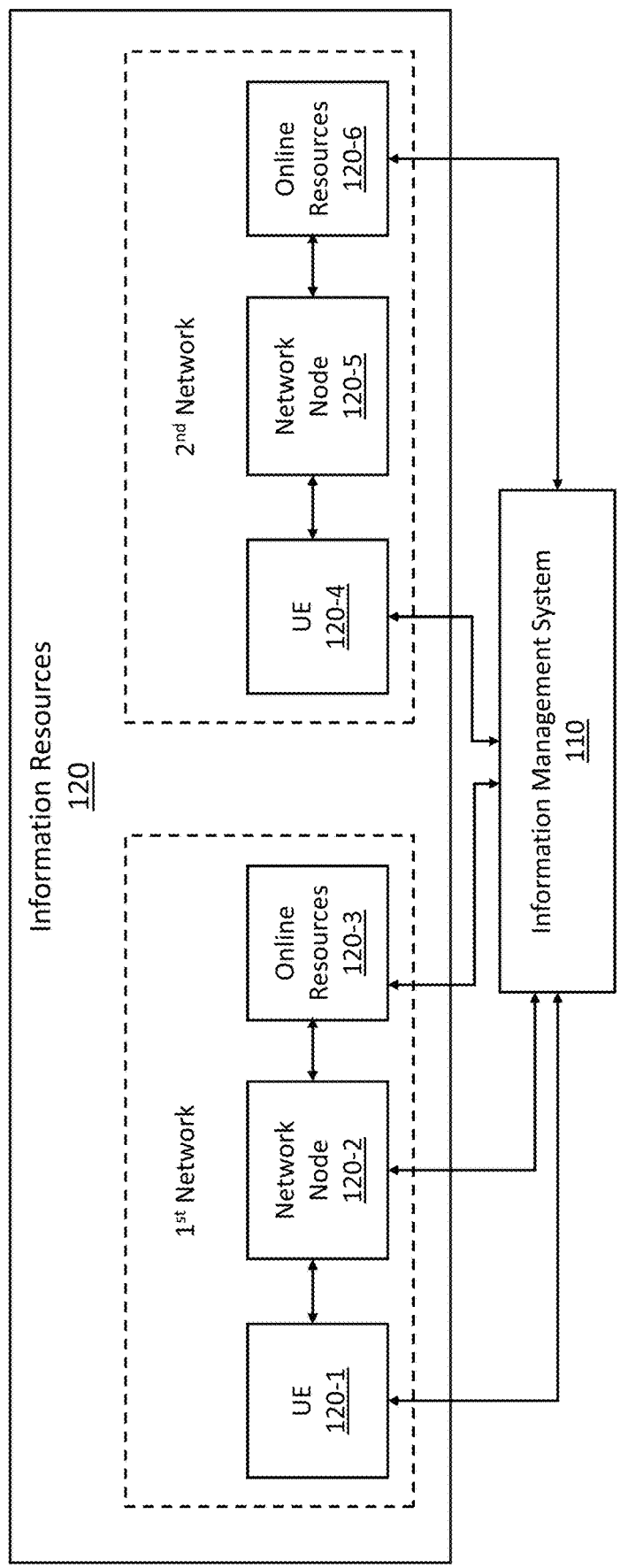
FIG. 1B illustrates an example configuration among the information management system and the plurality of information resources in FIG. 1A, according to one or more embodiments.

Furthermore, the storage 114 may also store computer-executable instructions which, when being executed by one or more processors (e.g., processor 112), causes the one or more processors to perform one or more actions/operations described herein Referring still to FIG. 1A, the information resources 120 may include a plurality of information resources 120-1 to 120-N. According to embodiments, the information resources 120 may include equipment or terminals which are associated with a specific network. FIG. 1B illustrates an example configuration among the information management system 110 and the plurality of information resources 120, according to one or more embodiments.

As illustrated in FIG. 1B, the information resources 120 may include a plurality of information resources associated with a plurality of networks. For instance, information resources associated with a first network may include a first user equipment (UE) 120-1, a first network node 120-2, and first online resources 120-3. Similarly, information resources associated with a second network may include a second UE 120-4, a second network node 120-5, and second online resources 120-6. Generally, within the first network, the first UE may access the first online resources 120-3 via transmitting signals or data packets to the first online resources 120-3 through the first network node 120-2. Similar process may be applicable to the second network.

The first UE 120-1 and/or the second UE 120-4 may include (but are not limited to): mobile devices and phones such as cellular phones (e.g., any "smart phone"), a personal computer, server computer, or laptop computer; personal digital assistants (PDAs); a roaming device, such as a network-connected roaming device; a wireless device such as a wireless email device or other device capable of communicating wireless with a computer network; or any other type of device that may communicate over a network and handle electronic transactions. In this regard, any discussion of any mobile device mentioned may also apply to other devices, such as devices including short-range ultra-high frequency (UHF) device, near-field communication (NFC), infrared (IR), and Wi-Fi functionality, among others.

The first network node 120-2 and/or the second network node 120-5 may include one or more network nodes associated with the respective network provider. For instance, the first network node 120-2 may include a base station (e.g., 4G eNodeB, 5G gNodeB, etc.) managed by a first network provider (e.g., a first network operator, a first virtual network operator, etc.), and the second network node 120-5 may include a base station (e.g., 4G eNodeB, 5G gNodeB, etc.) managed by a second network provider (e.g., a second network operator, a second virtual network operator, etc.).

The first online resources 120-3 and/or the second online resources 120-6 may include any suitable system, platform, device, or terminal which hosted information, materials, contents, or the like, from which the first UE 120-1 and/or the second UE 120-4 may obtain information. For instance, the first online resources 120-3 and/or the second online resources 120-6 may include a storage medium (e.g., a server, etc.) configured to store text, video, audio, image, or any other suitable internet content. In this regard, it can be understood that the first online resources 120-3 and the second online resources 120-6 may contain the same information (e.g., the first online resources 120-3 is the same with the second online resources 120-6, etc.), may contain information partially overlapped with each other, or may contain different information.

Referring still to FIG. 1B, the information management system 110 may be communicatively couple to the information resources of the first network and the second network (e.g., via the communication interface 111).

In the example illustrated in FIG. 1B, the information management system 110 is communicatively coupled to the first UE 120-1 and to the second UE 120-4. For instance, said first UE 120-1 and said second UE 120-4 may have software application(s) for performing network testing (e.g., download speed, upload speed, latency, signal strength, etc.) installed therein, may have software development kit (SDK) deployed therein, or the like, from which the information management system 110 is authorized by the associated users to obtain information (e.g., user permission for obtaining network information has been obtained during the installation of the software application, etc.). By way of example, the information management system 110 may receive information of the first network from said first UE 120-1 when a walk test is performed within the first network by a network testing application installed in the first UE 120-1. Similarly, the information management system 110 may receive information of the second network from said second UE 120-4 when an application with a SDK integrated therein is communicating with the second online resources 120-6 within the second network.

Further, in the example illustrated in FIG. 1B, the information management system 110 is communicatively coupled to the first network node 120-2 and to the first online resources to retrieve information of the first network therefrom, and is communicatively coupled to the second online resources 120-6 to retrieve information of the second network therefrom. In this example, although the information management system 110 is not coupled to the second network node 120-5, the information of the second network may still be collected from the second UE 120-4 and/or from the second online resources 120-6.

The information being collected from the information resources may include: KPI parameters of the first network and the second network (e.g., reference signal received power (RSRP), received signal strength indicator (RSSI), reference signal received quality (RSRQ), signal to interference and noise ratio (SINR), etc.), information of location at which the KPI parameter is obtained (e.g., longitude, latitude, etc.), information of timing at which the KPI parameter is obtained (e.g., time, date, etc.), information of the network provider (e.g., ID, mobile country code (MCC), mobile network code (MNC), access point name (APN), etc.), and the like.

According to embodiments, the information management system 110 may be configured to communicate with the information resources (e.g., first UE 120-1, first network node 120-2, first online resources 120-3, second UE 120-4, second online resources 120-6, etc.) via performing API communication with one or more software or applications deployed therein.

It is contemplated that the configuration illustrated in FIG. 1B is merely an example, and the scope of the present disclosure should not be limited thereto. Specifically, the information management system may collect information of the plurality of networks (e.g., first network, second network, etc.) in any other suitable or additional manner. For instance, the information management system 110 may obtain information of the network(s) via a data crowdsourcing platform, from another information management system, from a user via the input/output component 113, or the like, without departing from the scope of the present disclosure. Further, it can also be understood that each of the networks illustrated in FIG. 1B may include more than one UE, without departing from the scope of the present disclosure.

Referring back to FIG. 1A, the information management system 110 may be communicatively coupled to the information utilization party 130. In this regard, the information utilization party 130 may include any suitable equipment, terminal, system, or the like, of a user (e.g., a network user, a user of marketing team of a network provider, a user of technical team of the network provider, etc.) who would like to utilize the information provided by the information management system 110.

It can be understood that the configuration illustrated in FIG. 1A is merely an example, and the system configuration may be different from the one described above. Specifically, the information management system 110 may include more or less components, the configuration among the information management system 110 and other system(s) or components may be arranged in a different manner, or the like, without departing from the scope of the present disclosure.

For instance, the information management system 110 may be communicatively coupled to at least one user management system which is configured to perform one or more actions associated with the users. By way of example, based on determining that an unauthorized user (e.g., unregistered user, non-login user, etc.) has attempted to access the information management system 110, the information management system 110 may direct the user to the user management system, and the user management system may be configured to perform one or more operations for authenticating and authorizing the user (e.g., registering the user, enabling the user to login, granting temporary access, etc.). Upon successful user authentication and authorization, the user management system may redirect the user back to the information management system 110, along with a security token and information associated with the user (e.g., user role, access privilege, associated network provider, etc.). Accordingly, the information management system 110 may be configured to utilize the user information when required.

Example Operations for Managing Quality Information of Multiple Networks

As described above, example embodiments of the present disclosure may utilize an information management system to manage quality information of multiple networks. In the following, several example operations performable by the information management system are described.

It can be understood that one or more operations described herein may be performed by at least one processor (e.g., processor 112) of the information management system (e.g., system 110). According to embodiments, at least one storage medium or memory storage (e.g., storage 114) may store computer-executable instructions, and the at least one processor may be communicatively coupled to the memory storage/storage medium and may be configured to execute the instructions to perform one or more operations described herein.

Figure 2:
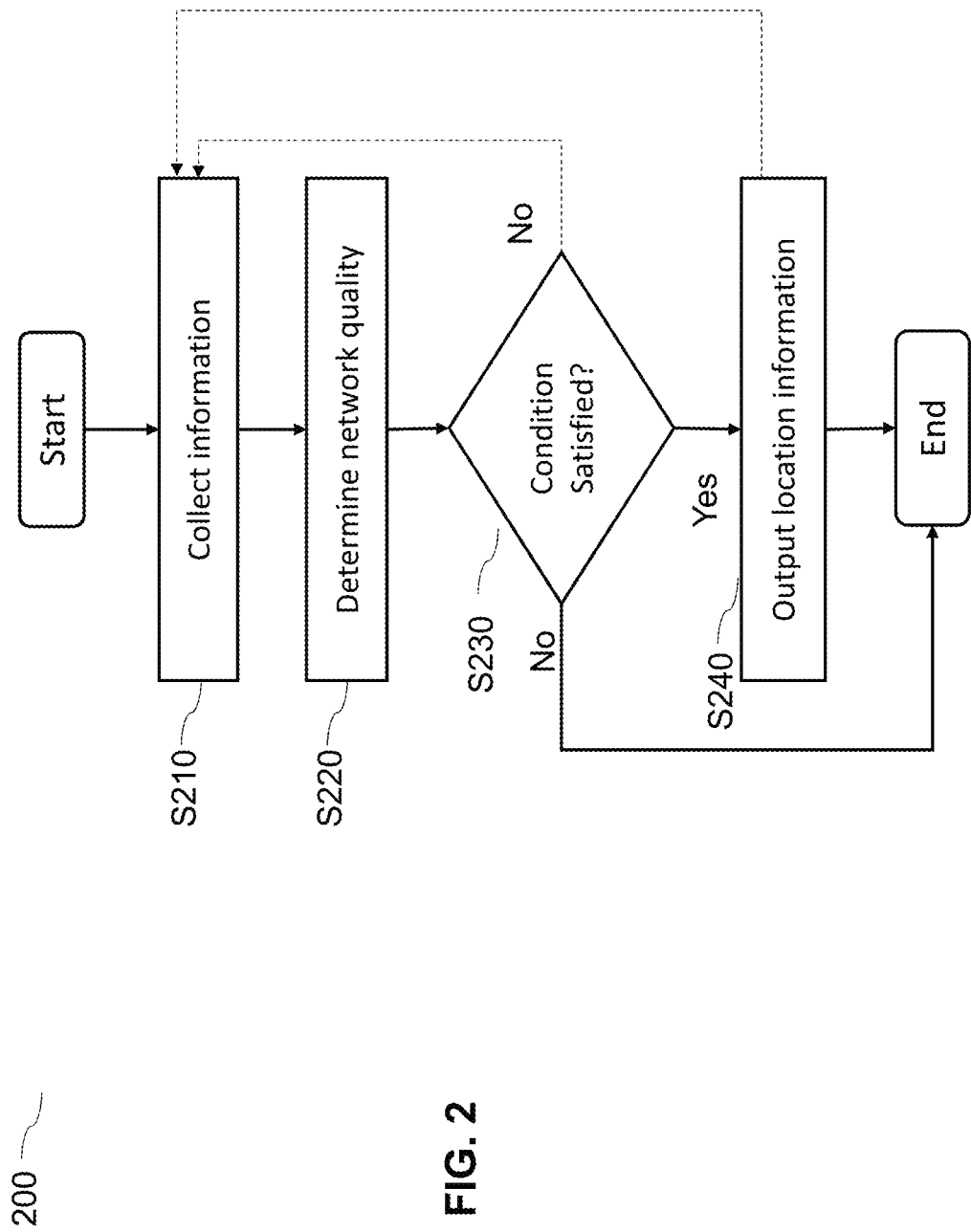
FIG. 2 illustrates a block diagram of an example method for managing quality information of a plurality of networks, according to one or more embodiments.

Referring first to FIG. 2, which illustrates a block diagram of an example method 200 for managing quality information of a plurality of networks, according to one or more embodiments. One or more operations in method 200 may be performed by the at least one processor of the information management system.

As illustrated in FIG. 2, at operation 210, the at least one processor may be configured to collect information. Specifically, the at least one processor may be configured to collect, from a plurality of information resources (e.g., information resources 120), information associated with the plurality of networks.

For instance, the processor 112 may collect the information from the one or more information resources via a communication interface (e.g., interface 111) of the information management system and/or via an input/output component (e.g., component 113) of the information management system. The one or more information resources may include at least one user equipment, at least one network node, at least one online resource, or the like, as described above with reference to FIG. 1B.

According to embodiments, the at least one processor may be configured to access the one or more information resources via one or more APIs and may extract the information from the one or more information resources by, for example, performing one or more API calls or sending one or more API requests to the one or more information resources.

Further, as described above with reference to FIG. 1B, the information being collected from the information resources may include information associated with the plurality of networks, such as: KPI parameter(s) of the plurality of networks (e.g., RSRP, RSRQ, RSSI, SINR, etc.), information of location at which the KPI parameter(s) is obtained (e.g., longitude, latitude, etc.), information of timing at which the KPI parameter(s) is obtained (e.g., time, date, etc.), information of the network provider(s) of the plurality of networks (e.g., ID, MCC, MNC, APN, etc.), and any other suitable information. Further, it can be understood that the information may be provided in the form of raw data, metadata, and/or in any other suitable format.

Furthermore, the collected information may include information as per location. For instance, the collected information may include one or more KPI parameters of one or more networks at one or more locations. By way of example, the collected information may include at least one KPI parameter of a first network collected by a first UE at a first location, at least one KPI parameter of a second network collected by a second UE at the first location, or the like. Additionally or alternatively, the collected information may include at least one KPI parameter of the first network at a second location, at least one KPI parameter of the second network at the second location, or the like. Further, the collected information may include at least one KPI parameter of a third network at the first location and/or at the second location, and the like.

According to embodiments, the at least one processor may collect the information for a specific longitude and/or a specific latitude, for a range of longitude and/or a range of latitude, or the like. For instance, the at least one processor may collect the information from information resources located at the specific longitude/latitude and/or located within a range of longitude/latitude. Alternatively or additionally, the at least one processor may collect information from all available information resources, and may then aggregate or categorize the collected information according to the specific longitude/latitude and/or located within a range of longitude/latitude.

Referring still to FIG. 2, at operation 220, the at least one processor may be configured to determine network quality of at least a portion of the plurality of networks. For instance, the at least one processor may determine network quality of a first network of the plurality of networks and network quality of a second network of the plurality of networks, or the like. According to embodiments, the at least one processor may be configured to determine, based on the collected information, a quality level of the portion of the plurality of networks (will be further described below with reference to FIG. 3 to FIG. 5).

Accordingly, at operation 230, the at least one processor may be configured to determine whether or not a condition associated with the network quality of the portion of the plurality of networks is satisfied. Further descriptions associated therewith are provided below with reference to FIG. 3 to FIG. 5.

Referring still to FIG. 2, upon determining that the condition is not satisfied, method 200 may be ended or may return to operation S210 such that the at least one processor may be configured to repeat operations S210 to S230. In this regard, it can be understood that the at least one processor may repeatedly perform operations S210 to S230 in any suitable manner, such as perform continuously, periodically, for a predetermined number of cycles, or the like.

On the other hand, upon determining that the condition is satisfied, method 200 may proceed to operation S240, at which the at least one processor may be configured to output information associated with a location at which the condition is satisfied (may be referred to as "location information" herein).

According to embodiments, the at least one processor may generate and output one or more graphical user interfaces (GUIs) to present the location information. For instance, the one or more GUIs may include a map illustrating an area (e.g., area selected by a user, etc.), wherein the map may include at least one icon representing the location at which the condition is satisfied. For example, based on determining that a condition of "quality level of the first network being higher/better than the quality level of the second network" is satisfied, an icon representing the location at which the first network having higher/better quality level than the quality level of the second network may be plotted on the map included in the one or more GUIs. In addition, the one or more GUIs may include additional elements, such as an overlay layer representing a network coverage of a specific network, one or more interactive elements (e.g., search box, drop-down list, button, etc.), or the like.

According to embodiments, upon determining that the condition is satisfied, the at least one processor may aggregate or record the associated location information and may store the same in at least one storage medium (e.g., storage 114), and may extract and output the stored information thereafter (e.g., in response to an event, etc.).

Upon completion of operation S240, method 200 may be ended or may return to operation S210, such that the at least one processor may be configured to repeatedly perform operations of method 200, in a similar manner as described above with reference to operation S230.

Figure 3:
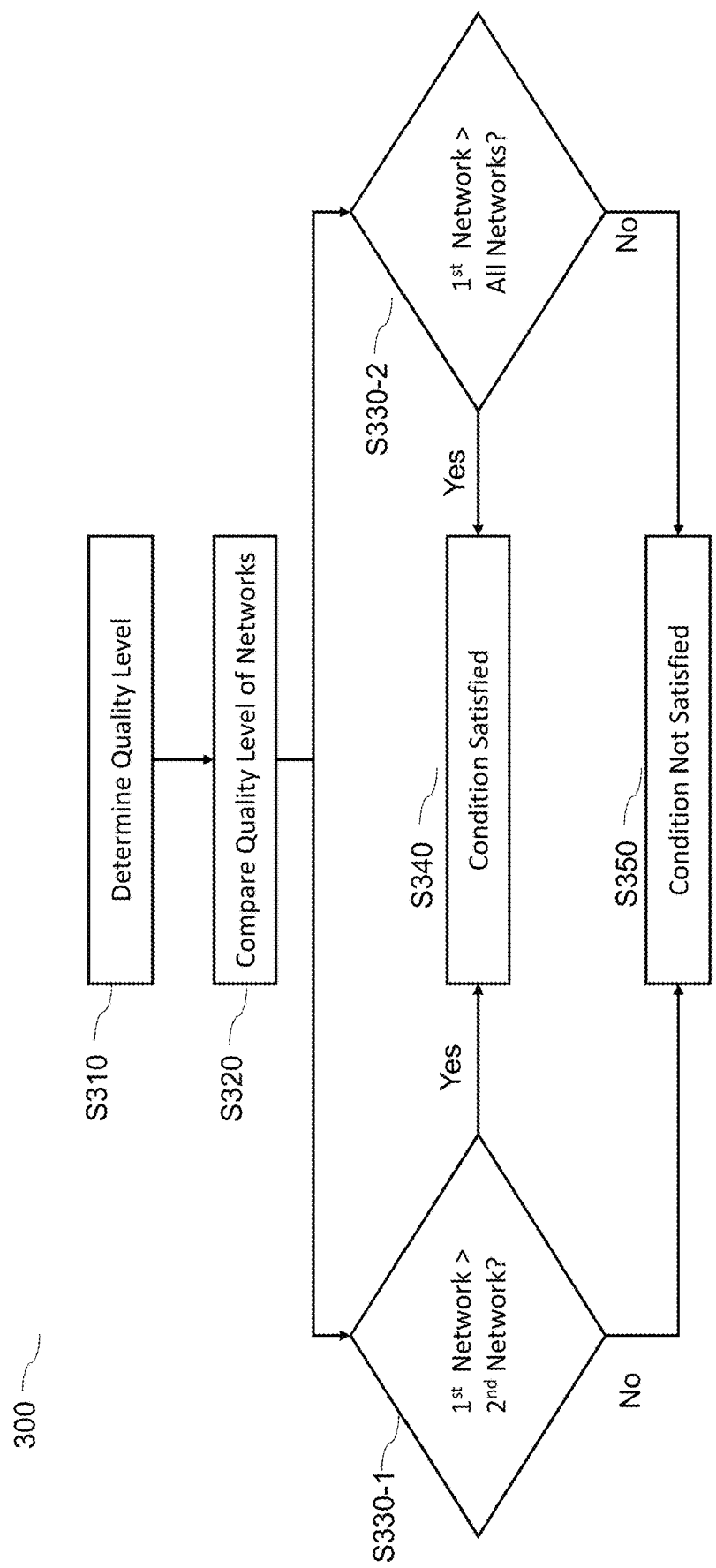
FIG. 3 illustrates a block diagram of an example method for processing collected information, according to one or more embodiments.

Referring next to FIG. 3, which illustrates a block diagram of an example method 300 for processing the information collected at operation S210 of method 200, according to one or more embodiments. Operation S310 in method 300 may be part of operation S220 in method 200, and operations S320-S350 in method 300 may be part of operation S230 in method 200. Similar to method 200, one or more operations in method 300 may be performed by the at least one processor of the information management system.

As illustrated in FIG. 3, at operation S310, the at least one processor may be configured to determine quality level of a portion of the plurality of networks. Alternatively, at operation S310, the at least one processor may determine quality level of all of the plurality of networks.

According to embodiments, the at least one processor may determine, based on the KPI parameter(s) associated with the respective network and a predefined mapping associated therewith, the quality level of the networks. For instance, FIG. 4 illustrates a table 400 containing examples of predefined mappings of threshold values of KPI parameters and the respective quality level. The mappings, the threshold values, and/or the quality levels may be predetermined or predefined by the user (e.g., user from the network provider such as technical team, marketing team, etc.).

In the example of FIG. 4, it is illustrated that table 400 includes the mappings associated with RSRP, although it can be contemplated that table 400 may include mappings associated with other KPI parameters (e.g., RSRQ, SINR, etc.) in a similar manner. Further, it can be understood that each of the quality levels may be represented by an associated value (e.g., "5" represent "Excellent", "1" represent "Very Poor", etc.), without departing from the scope of the present disclosure. Furthermore, according to implementations, the quality level of a network may be determined according to a combination of KPI parameters (e.g., quality level of the network is "Excellent" when RSRP value is within a threshold A and RSRQ value is within a threshold B, etc.).

In view of the above, at operation S310, the at least one processor may determine, based on the predefined mappings and the KPI parameters included in the collected information, the quality level of the networks, in real-time, near real-time, or the like.

For instance, assuming that the collected information includes RSRP values of a first network, a second network, and a third network, the at least one processor may determine the quality level of said first network, said second network, and said third network by determining (based on the predefined mappings) which threshold range their respective RSRP value(s) falls under, and then determine the quality level associated therewith. By way of example, assuming that the first network has an RSRP value of −97, the second network has an RSRP value of −103, and the third network has an RSRP value of −94, the at least one processor may determine (e.g., based on the mappings included in table 400) that the first network has a quality level of "Good", the second network has a quality level of "Fair", and the third network has a quality level of "Excellent".

Referring back to FIG. 3, upon determining the quality level of the networks, method 300 may proceed to operation S320, at which the at least one processor may be configured to compare at least a portion of the determined quality levels.

According to embodiments, the at least one processor may be configured to compare the quality levels as per location. For instance, the at least one processor may determine which of the quality levels are determined based on information collected from a location point (e.g., a specific longitude/latitude, a range of longitude/latitude, etc.), and may then compare said quality levels thereafter.

By way of example, assuming that the at least one processor determines that the quality levels of the first network and the second network are determined based on information collected from a specific location, the at least one processor may compare the quality level of the first network and the quality level of the second network. Subsequently, method 300 may proceed to operation S330-1, at which the at least one processor may determine whether or not a condition of "quality level of the first network is greater than quality level of the second network" is satisfied.

As another example, assuming that the at least one processor determines that the quality levels of all available networks (e.g., the first network, the second network, the third network) are determined based on information collected from the specific location, the at least one processor may compare the quality levels of all available networks. Subsequently, method 300 may proceed to operation S330-2, at which the at least one processor may determine whether or not a condition of "quality level of the first network is greater than quality level of all of the remaining networks" is satisfied.

In this regard, it can be understood that the conditions described above with reference to operations S330-1 and S330-2 are merely examples, and other suitable conditions may be applicable in a similar manner.

For instance, FIG. 5 illustrates a table 500 containing examples of conditions and the associated requirements, according to one or more embodiments. It can be understood that the conditions may also be presented as per network provider basis, or the like, instead of as per network basis as exemplified in FIG. 5.

As illustrated in FIG. 5, a condition (e.g., condition 1) may require the first network to have a quality level of either "Excellent", "Good", or "Fair", and at the same time may require that the second network to have a quality level of either "Weak" or "Poor". Upon determining that the requirements on the quality levels of the first network and the second network are satisfied, the at least one processor may determine that the said condition is satisfied. On the other hand, another condition (e.g., condition 3) may have opposite requirements, which require the first network to have a quality level of either "Weak" or "Poor", and at the same time require the second network to have a quality level of either "Excellent", "Good", or "Fair".

Referring back to FIG. 3, based on determining that the condition is satisfied, method 300 may proceed to operation S340, at which the at least one processor may record that the result (e.g., "the condition is satisfied") and the associated information (e.g., location information, etc.), and may then proceed to further operation (e.g., operation S240). On the other hand, based on determining that the condition is not satisfied, method 300 may proceed to operation S350, at which the at least one processor may record the result (e.g., "the condition is not satisfied") and may terminate the operation or return to the previous operation (e.g., operation S210).

According to embodiments, the at least one processor may receive user input(s) specifying the networks of which the quality levels should be compared and/or the to-be determined condition(s). Accordingly, based on the user input(s), the at least one processor may compare the quality levels of the user-selected networks, and may determine whether or not the user-selected condition(s) is satisfied, in a manner similar as described hereinabove.

In some implementations, the at least one processor may be configured to perform one or more of the above described operations for multiple location points (e.g., multiple longitudes/latitudes, etc.). For instance, referring to FIG. 6, which illustrates a block diagram of an example method 600 for managing quality information of the plurality of networks at a plurality of location points, according to one or more embodiments.

Method 600 may be performed by at least one processor of the information management system, and one or more operations of method 600 may be similar to one or more operations of method 200 and method 300 as described hereinabove. Thus, redundant descriptions associated therewith may be omitted in below for conciseness.

Figure 6:
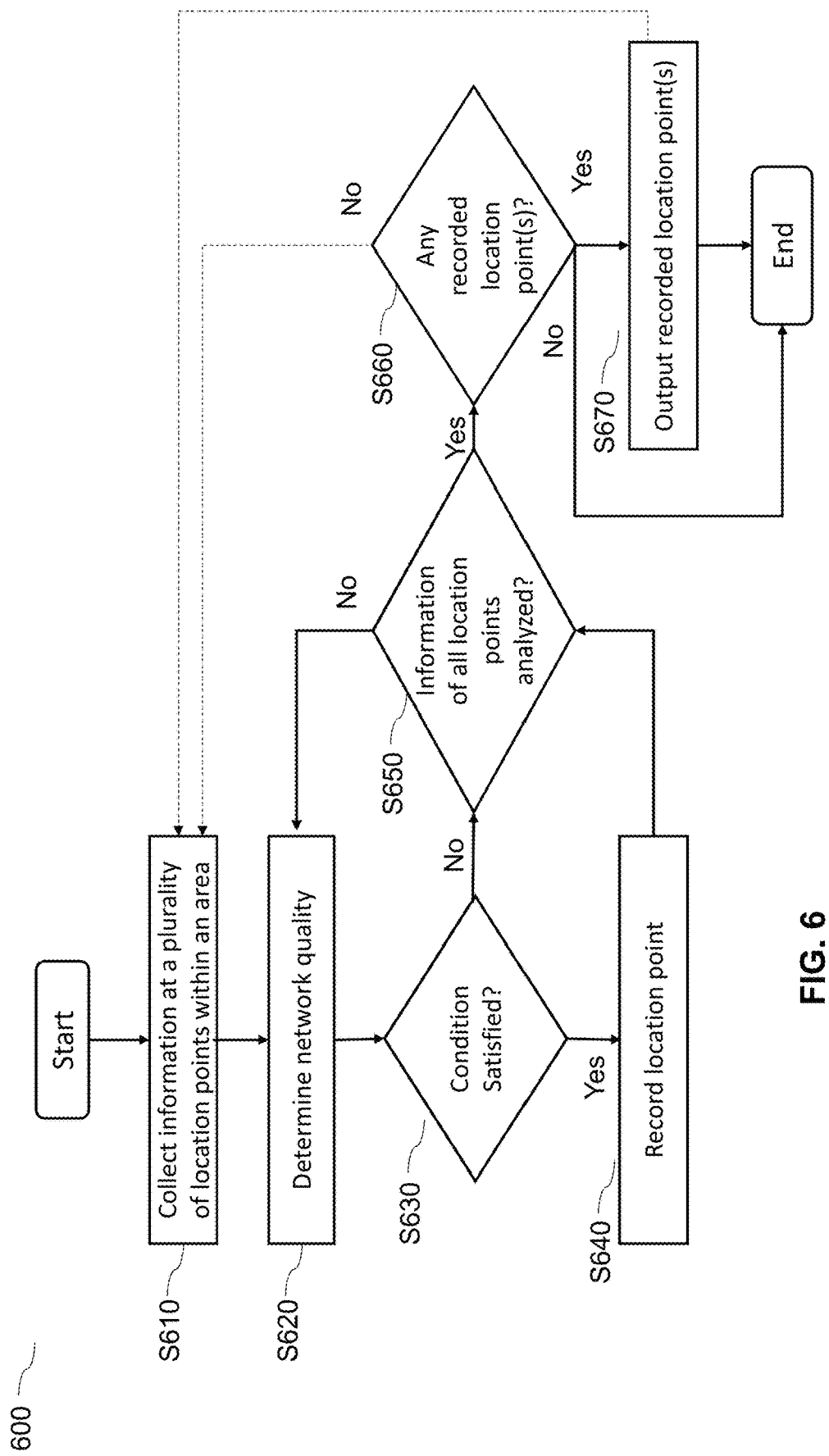
FIG. 6 illustrates a block diagram of an example method for managing quality information of the plurality of networks at a plurality of location points, according to one or more embodiments.

As illustrated in FIG. 6, at operation S610, the at least one processor may be configured to collect information associated with a plurality of networks at a plurality of location points within an area. The process of collecting information from information resources, as well as the contents of the collected information, may be similar to those described above with reference to operation S210 in method 200.

In addition, the at least one processor may be configured to collect information from all available information resources (e.g., information resources 120) located within the area, wherein at least a portion of the information resources are located at different locations within the area.

Alternatively or additionally, the area may be selected or specified by a user. For instance, the at least one processor may generate and present a GUI including an interactive element (e.g., input field, search box, drop-down list, etc.) to enable the user to select or specify an intended area. Subsequently, the at least one processor may determine one or more information resources located within the user-selected area, may communicate with the determined information resources, and may collect information from the determined information resources thereafter.

At operation S620, the at least one processor may be configured to determine network quality of at least a portion of the plurality of networks, based on the collected information. The specific processes associated therewith may be similar to those described above with reference to operation S220 in method 200 and operation S310 in method 300.

At operation S630, the at least one processor may be configured to determine whether or not a condition associated with the network quality of the portion of the plurality of networks is satisfied. The condition may be selected or specified by a user. The specific processes associated therewith may be similar to those described above with reference to operation S230 in method 200 and operations S320-S350 in method 300.

Based on determining that the condition is satisfied, method 600 may proceed to operation S640. In this operation, the at least one processor may be configured to record the location point (e.g., specific longitude/latitude of the location, etc.) at which the condition is satisfied. For instance, the at least one processor may record said location point in a record file (e.g., a computer readable file containing a table, etc.) or in any other suitable recording format. Accordingly, method 600 may proceed to operation S650.

On the other hand, based on determining that the condition is not satisfied, method 600 may proceed to operation S650, without initiating operation S640. At operation S650, the at least one processor may be configured to determine whether or not collected information associated with all location points has been analyzed.

Based on determining that the collected information of all location points have been analyzed, method 600 may proceed to operation S660. Otherwise, based on determining that the collected information of all location points have not yet been analyzed, method 600 may return to operation S620, such that the remaining information (i.e., non-analyzed information) may be analyzed. In this way, the information management system may iteratively perform operations S620-S650 until the collected information of all location points has been analyzed.

At operation S660, the information management system may be configured to determine whether or not any recorded location point(s) is available. For instance, the at least one processor may retrieve the record file and determine whether or not said record file include any location point(s) recorded are operation S640. Based on determining that there is no available location point (i.e., no location point is recorded at operation S640), method 600 may end or may alternatively return to operation S610 such that method 600 may be repeatedly or iteratively performed (e.g., continuously, periodically, for a predetermined amount of cycles, etc.).

On the other hand, based on determining that one or more recorded location points are available, method 600 may proceed to operation S670, at which the information of the one or more recorded location points are outputted. According to embodiments, the at least one processor may generate one or more GUIs to present the information of the one or more recorded location points. For instance, the at least one processor may generate and present a map including the one or more recorded location points. Subsequently, method 600 may end or may alternatively return to operation S610 such that method 600 may be repeatedly or iteratively performed (e.g., continuously, periodically, for a predetermined amount of cycles, etc.).

Examples of Graphical User Interface (GUI)

As described hereinabove, the at least one processor (e.g., processor 112) of the information management system may generate and provide one or more GUIs to the associated user(s) to present information associated with network quality of a plurality of networks (e.g., location point(s) at which a network has better/worse network quality over another network(s), etc.). In the following, several examples of GUI which may be generated and presented by the at least one processor are described with reference to FIG. 7 to FIG. 9D.

In this regard, for illustrative and descriptive purposes, the GUIs described hereinbelow are associated with an example use case in which a user associated with a first network (e.g., a user of marketing team or technical team of the first network provider, etc.) is accessing the information management system and is interacting with the GUIs.

Figure 7:
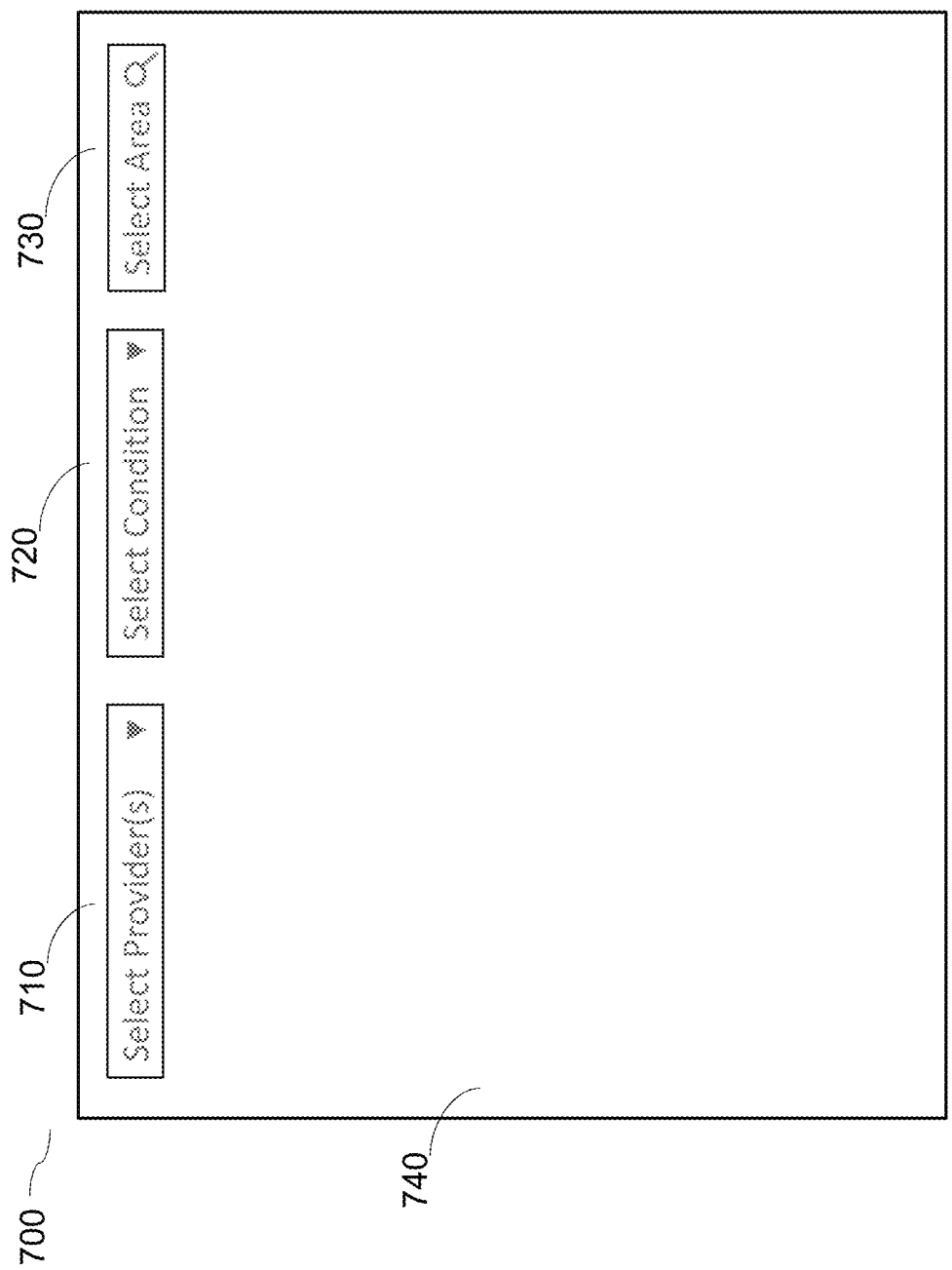
FIG. 7 illustrates a first GUI presented to a user, according to one or more embodiments.

Referring first to FIG. 7, which illustrates a first GUI 700 presented to the user, according to one or more embodiments. The GUI 700 may include a first interactive element 710, a second interactive element 720, a third interactive element 730, and a presentation area 740.

The first interactive element 710 may be interactable by the user to select or specify a network or a network provider. For example, as illustrated in FIG. 7, the first interactive element 710 may include a drop-down list including options of selectable networks or available network providers, and the user may interact with the first interactive element 710 to select the intended network provider(s) or network(s) therefrom. The selectable options may include: a specific network/a specific network provider (e.g., a second network/a second network provider, a third network/a third network provider), a combination of networks/a combination of network providers, all networks/all network providers, or the like.

The second interactive element 720 may be interactable by the user to select or specify a condition. For example, as illustrated in FIG. 7, the second interactive element 720 may include a drop-down list including options of selectable conditions, and the user may interact with the second interactive element 720 to select the intended condition(s) therefrom. The selectable conditions may include generic conditions, such as: "better quality", "poorer quality", or the like. Alternatively or additionally, the selectable conditions may include specific conditions, such as: "Higher RSRP", "Lower SINR", or the like.

The third interactive element 730 may be interactable by the user to select or specify an area at which the user would like to obtain the quality information. For example, as illustrated in FIG. 7, the first interactive element 710 may include an input field (e.g., a search box, etc.), in which the user may input a keyword of the intended area.

It can be understood that the interactive elements 710-730 illustrated in FIG. 7 are merely examples of possible embodiments, and the scope of the present disclosure should not be limited thereto. Specifically, said interactive elements may include any other suitable elements/components (e.g., the first interactive element 710 and the second interactive element 720 may be a search box, the third interactive element 730 may be a drop-down list, etc.), said interactive elements may be arranged in different locations, or the like, without departing from the scope of the present disclosure.

The presentation area 740 may be the area in which one or more information (e.g., map, location information, etc.) are presented. In the example illustrated in FIG. 7, the presentation area 740 is empty since the user has not yet selected or specified any area in interactive element 730. According to other embodiments, when there is no available user-selected area (e.g., the user has not yet interacted with the interactive element 730, etc.), the at least one processor may generate the GUI 700 in default such that the presentation area 740 includes a map illustrating a location at which the user is located, or the like. Further, several examples in which one or more information are presented in the presentation area are described below with reference to FIG. 8 to FIG. 9D.

According to embodiments, the GUI 700 may be generated by the at least one processor upon detecting an access from the user. For instance, the at least one processor may obtain (from a storage medium, from a user management system, etc.) information associated with the user (e.g., role of the user, the associated network provider, etc.), and may generate the GUI 700 based on said information. By way of example, based on determining (from the user information)

that the user is associated with the first network, the at least one processor may collect information associated with the first network in real-time or near real-time (e.g., communicate with information resources associated with the first network to obtain information associated with the first network, communicated with information resources located nearby the area in which the first network is provided to obtain information associated with networks available nearby the first networks, collect information of conditions associated with the first networks, etc.), and may generate the GUI 700 based on the collected information.

In view of the above, the user may interact with the interactive elements 710-730 of GUI 700 to select an intended area and to specify an intended condition thereof. For instance, the user may view information (e.g., network coverage, etc.) of an associated network (e.g., the first network) at a specific area by interacting with the third interactive element 730 (further described below with reference to FIG. 8), and may opt to compare the quality information of the associated network with other network(s) at or around the specific area by interacting with the first interactive element 710 and the second interactive element 720 (further described below with reference to FIG. 9A to FIG. 9D).

Figure 8:
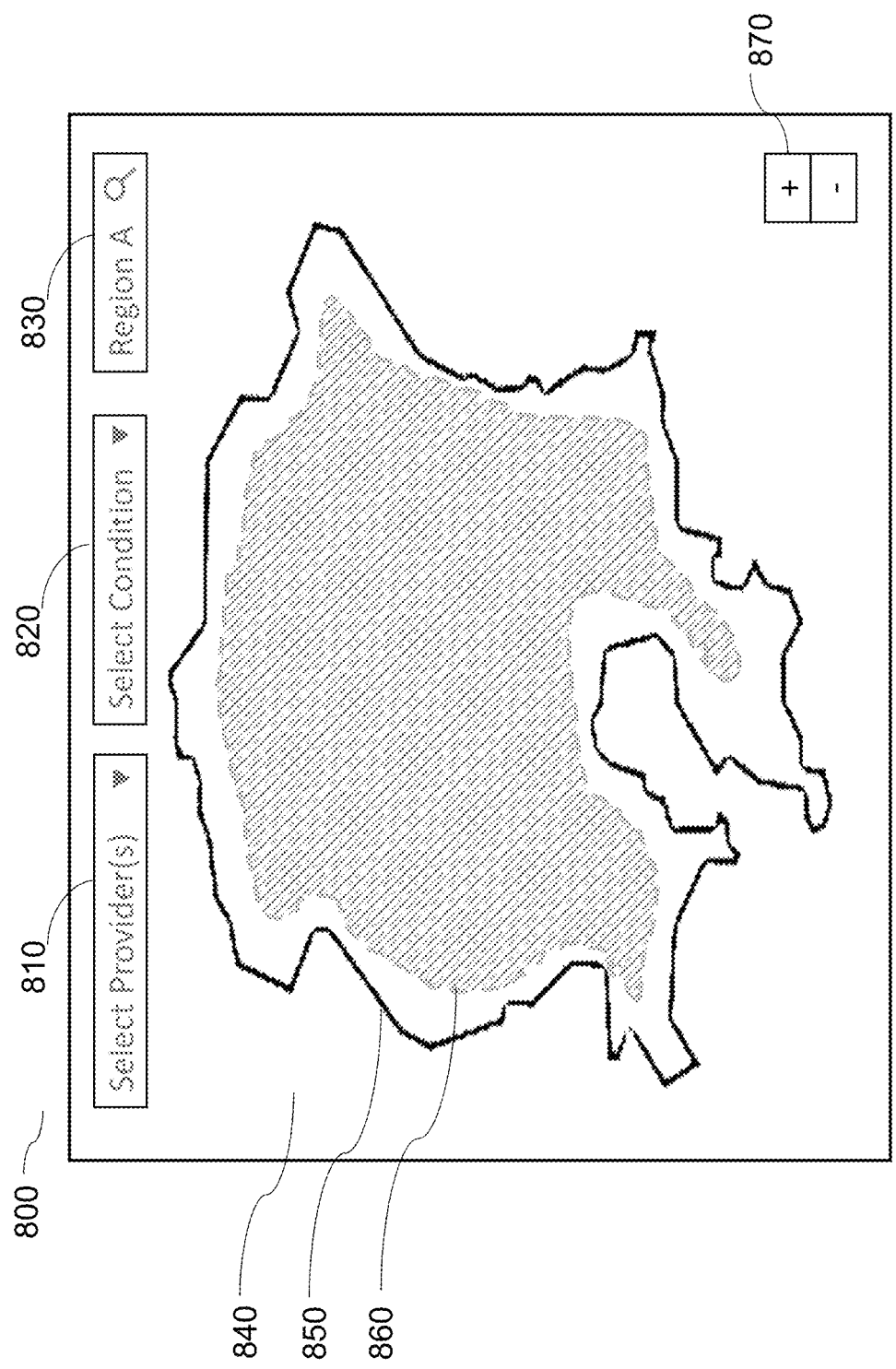
FIG. 8 illustrates a second GUI presented to the user, according to one or more embodiments.

Referring next to FIG. 8, which illustrates a second GUI 800 presented to the user, according to one or more embodiments. GUI 800 may be an updated version of GUI 700, which is generated or updated by the at least one processor based on a user input in the interactive element 730 in GUI 700. In this regard, one or more components of GUI 800 may be similar with one or more components of GUI 700 (e.g., interactive elements 810, 820, and 830 in GUI 800 may be similar with interactive elements 710, 720, and 730 in GUI 700, respectively, presentation area 840 in GUI 800 may be similar to presentation 740 in GUI 700, etc.), thus redundant descriptions associated therewith may be omitted in below for conciseness.

As illustrated in FIG. 8, the presentation area 840 of GUI 800 may include a map 850 associated with a user-selected area ("Region A"). The map 850 may include an overlay layer 860 representing coverage area of the first network within the user-selected area. In this way, the user may quickly grasp or identify the coverage level of the associated network within the selected area.

Further, GUI 800 may include one or more additional interactive elements 870 interactable by the user to modify the presentation of the map 850 and/or the overlay layer 860. For instance, upon determining a user interaction with the "+" button, the at least one processor may update the presentation area 840 to present an enlarged version of the map 850, or the like.

In the example of FIG. 8, GUI 800 only illustrates information of the first network (i.e., network associated with the user) since the user has not yet specified or selected other network(s)/network provider(s) via interactive element 810 and has not yet specified or selected the condition(s) to be computed via interactive element 820. In the following FIG. 9A to FIG. 9D, descriptions of several examples GUI, in which the user has specified/selected the other network(s)/network provider(s) and the condition(s) to be computed, are provided.

Figure 9A:
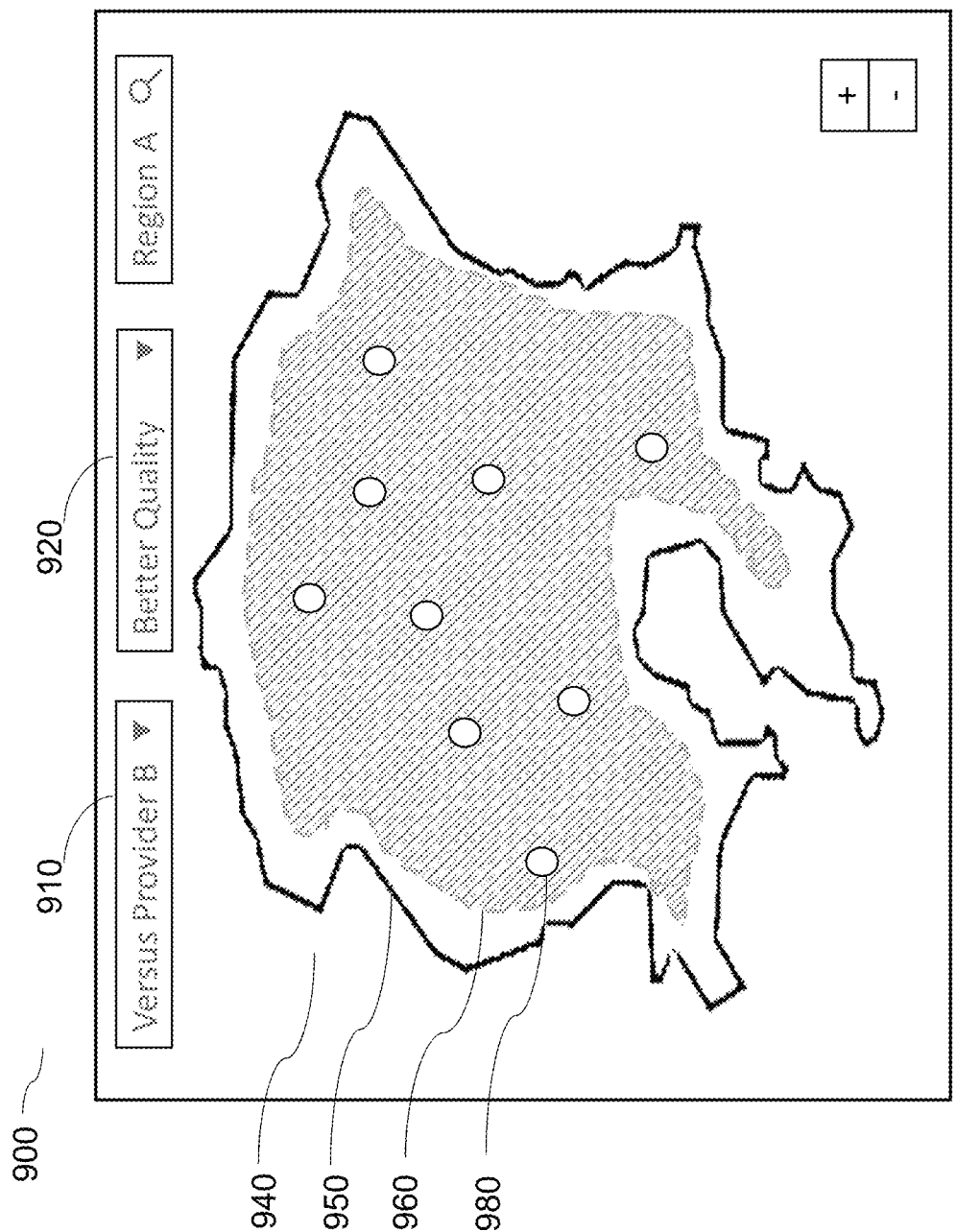
FIG. 9A illustrates a first configuration of a third GUI presented to the user, according to one or more embodiments.

Referring first to FIG. 9A, which illustrates a first configuration of a third GUI 900 presented to the user, according to one or more embodiments. GUI 900 may be an updated version of GUI 800, which is generated by the at least one processor based on a user input in the interactive element 810 and interactive element 820 in GUI 800. In this regard, one or more components of GUI 900 may be similar with one or more components of GUI 800 (e.g., interactive elements 910-920 in GUI 900 may be similar with interactive elements 810-820 in GUI 800, presentation area 940 in GUI 900 may be similar to presentation area 840 in GUI 800, map 940 in GUI 900 may be similar to map 840 in GUI 800, etc.), thus redundant descriptions associated therewith may be omitted in below for conciseness.

For instance, GUI 900 in FIG. 9A may be generated and presented by the at least one processor, based on determining that the user has selected "Versus Provider B" from the interactive element 910 and has selected "Better Quality" from the interactive element 920, which defines a condition of "quality level of the first network being better/higher than quality level of a network associated with network provider B".

As illustrated in FIG. 9A, the GUI 900 may include a plurality of icons 980 plotted on the map 950. Each of the plurality of icons 980 may represent a location point at which the defined condition is satisfied within the user-selected area. In this example, the plurality of icons 980 represent the location points at which the quality level of the first network is better/higher than quality level of a network provided by network provider B within Region A. In this way, the user may quickly grasp or identify the locations at which the first network has advantages over a specific network(s) associate with a specific network provider at or nearby a specific area.

Figure 9B:
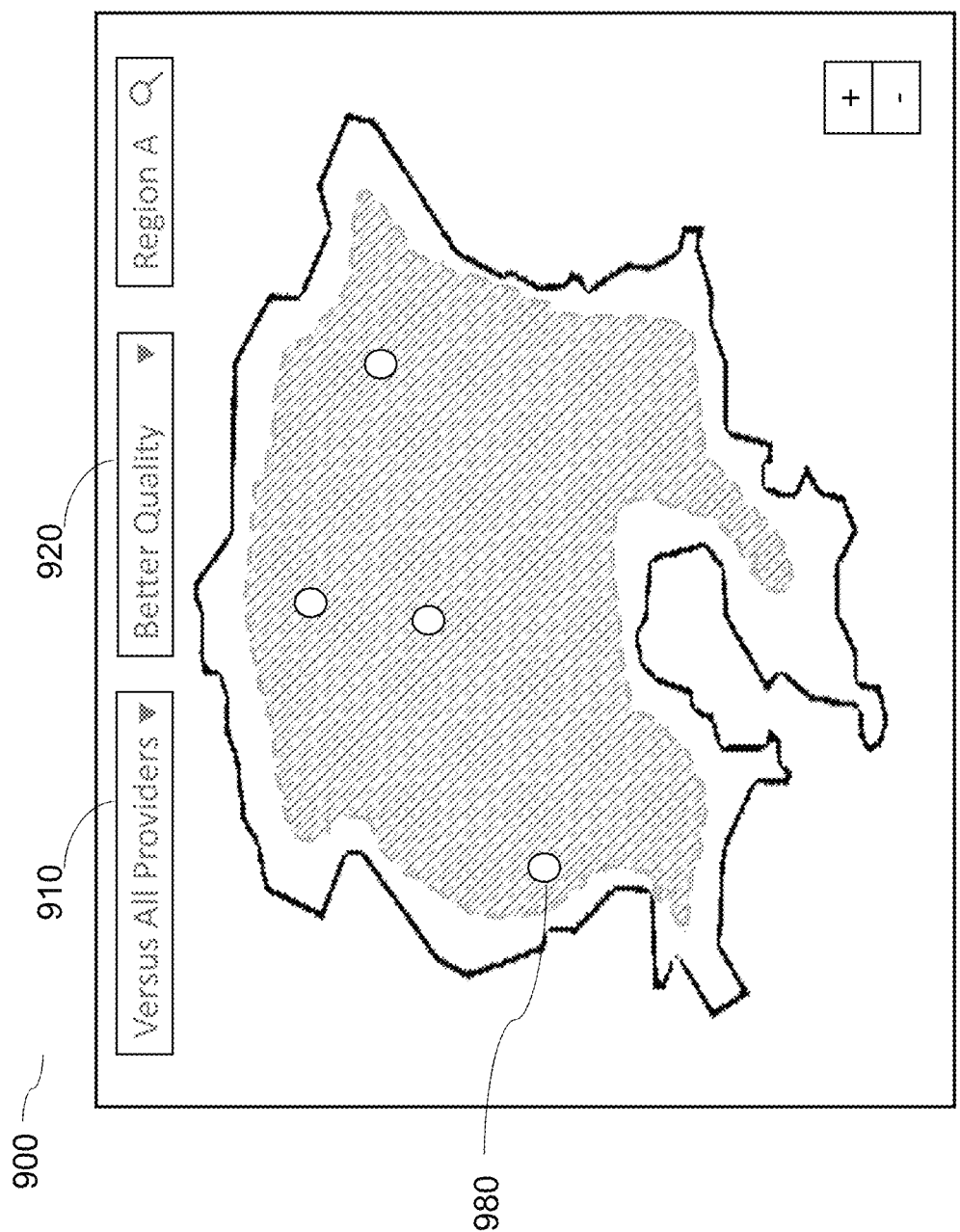
FIG. 9B illustrates a second configuration of the third GUI, according to one or more embodiments.

Referring next to FIG. 9B, which illustrates a second configuration of the third GUI 900, according to one or more embodiments. At least a portion of GUI 900 in FIG. 9B may be similar to GUI 900 in FIG. 9A, thus redundant descriptions associated therewith may be omitted in below for conciseness.

In this regard, GUI 900 in FIG. 9B may be generated and presented by the at least one processor, based on determining that the user has selected "Versus All Providers" from the interactive element 910 and has selected "Better Quality" from the interactive element 920, which defines a condition of "quality level of the first network being better/higher than quality level of all available networks associated with all network providers".

In this regard, the plurality of icons 980 plotted on the map in the GUI 900 of FIG. 9B may represent the location points at which the quality level of the first network is better/higher than quality level of all available networks provided by all of other network providers within Region A. In this way, the user may quickly grasp or identify the locations at which the first network has advantages over all available networks associated with all available network providers at or nearby the specific area.

Figure 9C:
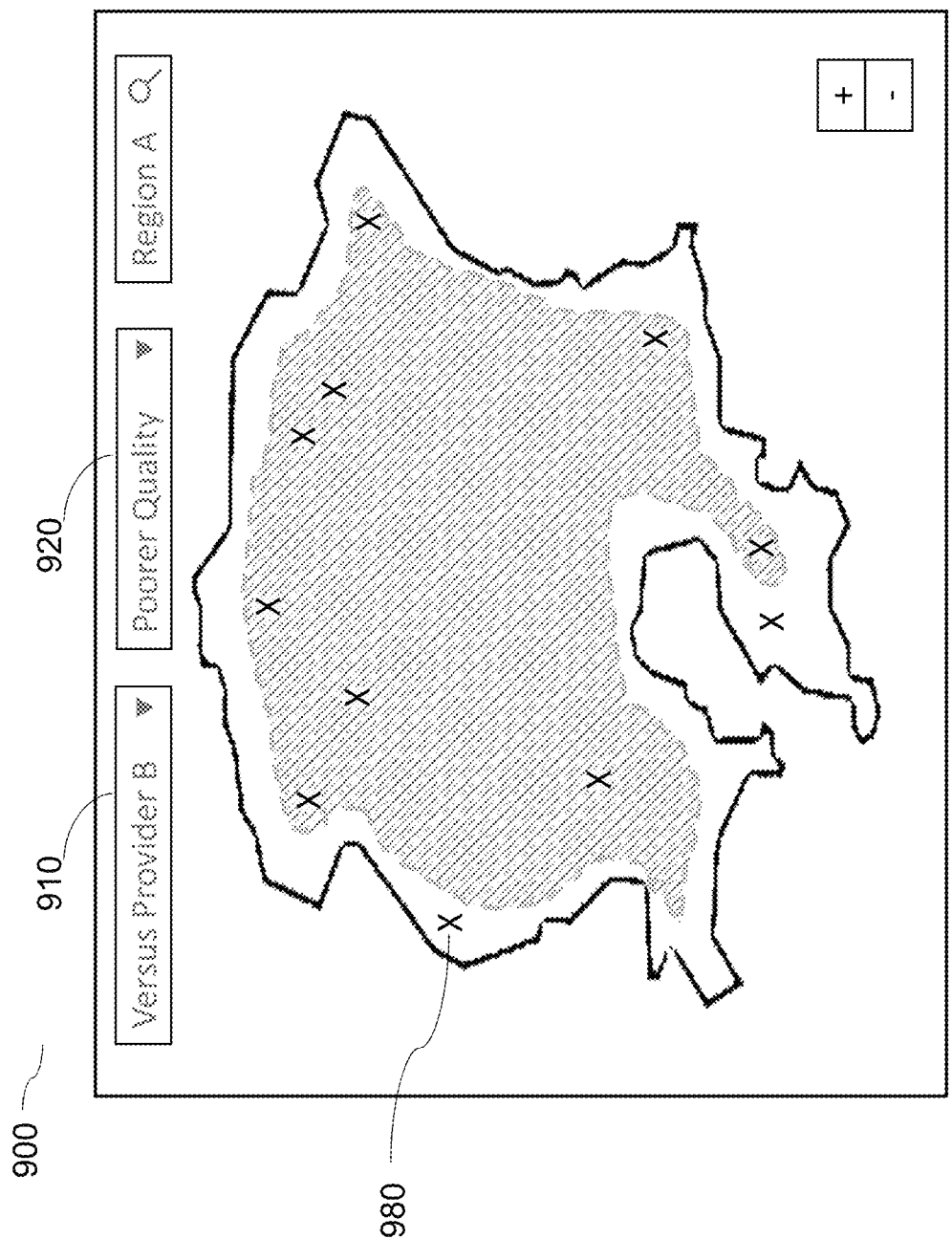
FIG. 9C illustrates a third configuration of the third GUI, according to one or more embodiments.

Referring next to FIG. 9C, which illustrates a third configuration of the third GUI 900, according to one or more embodiments. At least a portion of GUI 900 in FIG. 9C may be similar to GUI 900 in FIG. 9A and FIG. 9B, thus redundant descriptions associated therewith may be omitted in below for conciseness.

In this regard, GUI 900 in FIG. 9C may be generated and presented by the at least one processor, based on determining that the user has selected "Versus Provider B" from the interactive element 910 and has selected "Poorer Quality" from the interactive element 920, which defines a condition of "quality level of the first network being poorer/lower than quality level of a network associated with the network provider B".

In this regard, the plurality of icons 980 plotted on the map in the GUI 900 of FIG. 9C may represent the location points at which the quality level of the first network is poorer/lower than quality level of a network provided by network provider B within Region A. In this way, the user may quickly grasp or identify locations at which the first network has disadvantages over a specific network(s) associated with specific network provider at or nearby the specific area. Further, the plurality of icons 980 in FIG. 9C may be presented in a manner distinguishable from the plurality of icons 980 in FIG. 9A and FIG. 9B, such that the user may be notify about the difference in the nature of the associated conditions.

Figure 9D:
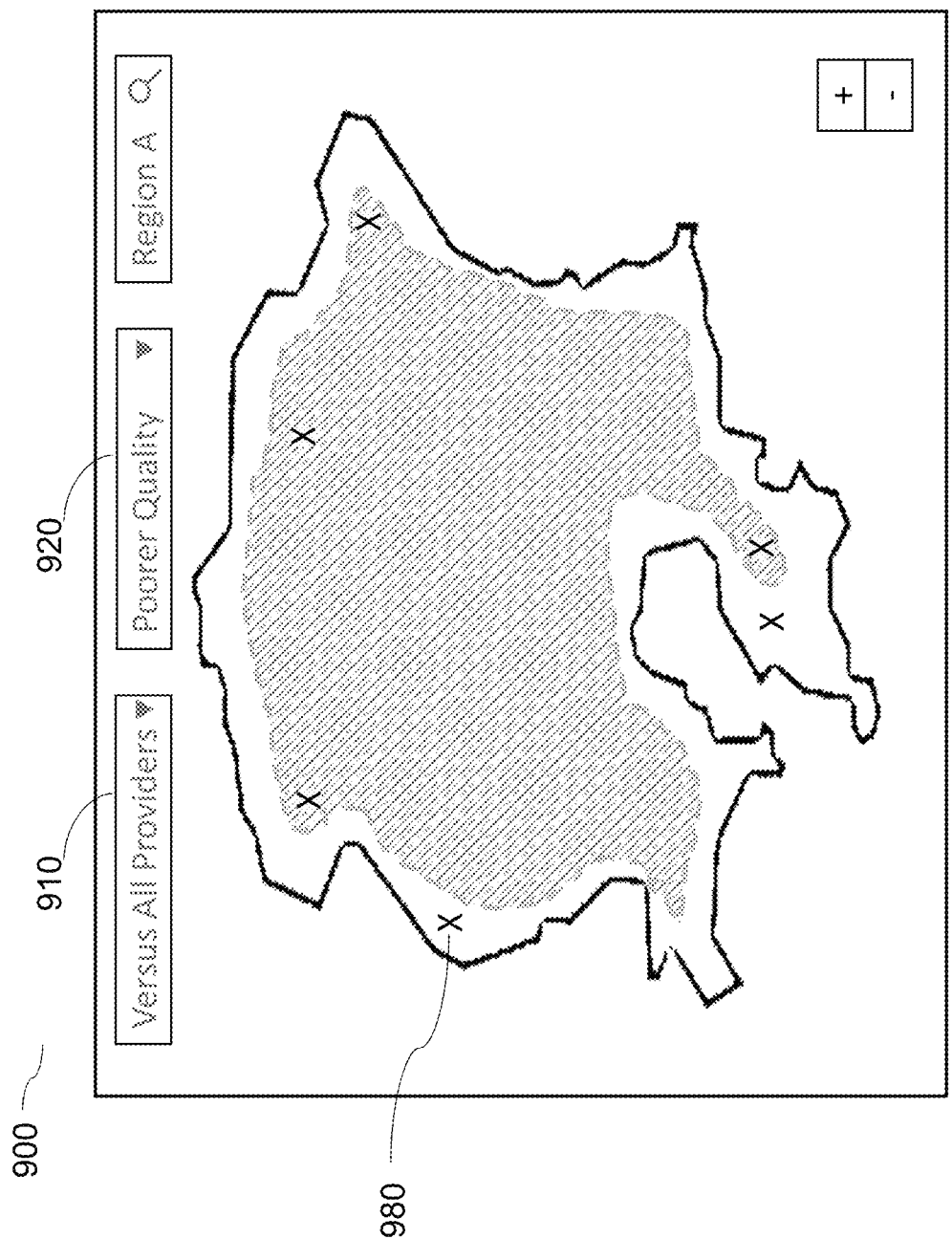
FIG. 9D illustrates a fourth configuration of the third GUI, according to one or more embodiments.

Referring next to FIG. 9D, which illustrates a fourth configuration of the third GUI 900, according to one or more embodiments. At least a portion of GUI 900 in FIG. 9D may be similar to GUI 900 in FIG. 9C, thus redundant descriptions associated therewith may be omitted in below for conciseness.

In this regard, GUI 900 in FIG. 9D may be generated and presented by the at least one processor, based on determining that the user has selected "Versus All Providers" from the interactive element 910 and has selected "Poorer Quality" from the interactive element 920, which defines a condition of "quality level of the first network being poorer/lower than quality level of all available networks associated with all network providers".

In this regard, the plurality of icons 980 plotted on the map in the GUI 900 of FIG. 9D may represent the location points at which the quality level of the first network is poorer/lower than quality level of all available networks provided by all of other network providers within Region A. In this way, the user may quickly grasp or identify the locations at which the first network has disadvantages over all available networks associated with all available network providers at or nearby the specific area.

It can be understood that the GUIs described herein are merely examples for illustrative and descriptive purposes, and are not intended to be exhaustive or to limit the scope of the present disclosure. Specifically, the GUIs may include more or less components (e.g., information, interactive elements, etc.), the components included in the GUIs may be arranged in different manner, or the like, without departing from the scope of the present disclosure. For example, the GUI(s) may have only one icon plotted on the map (instead of having a plurality of icons plotted as illustrated in GUI 900), the overlay layer may be optional and may be excluded from the GUIs when required, multiple GUIs may be simultaneously presented to the user, or the like.

In view of the above, the one or more GUIs generated and presented by the information management system of the present disclosure may allow the users to easily view, analyze, and grasp the quality information of one or more of the available networks. Among others, the icons plotted on the map in the GUIs may effectively reflect the condition of the network associated with the user. For example, the user may quickly identify the location(s) at which the associated network has advantages (e.g., better network quality, etc.) over a portion of or all available networks within a specific location or area. Such information may be helpful for the user, for example, in constructing accurate and effective marketing strategies accordingly. As another example, the user may also quickly identify the location(s) at which the associated network has disadvantages (e.g., lower network quality, etc.) over a portion of or all available networks. Such information may be helpful for the user, for example, in constructing accurate and effective network planning or enhancement strategies accordingly.

Example Implementation Environment

Figure 10:
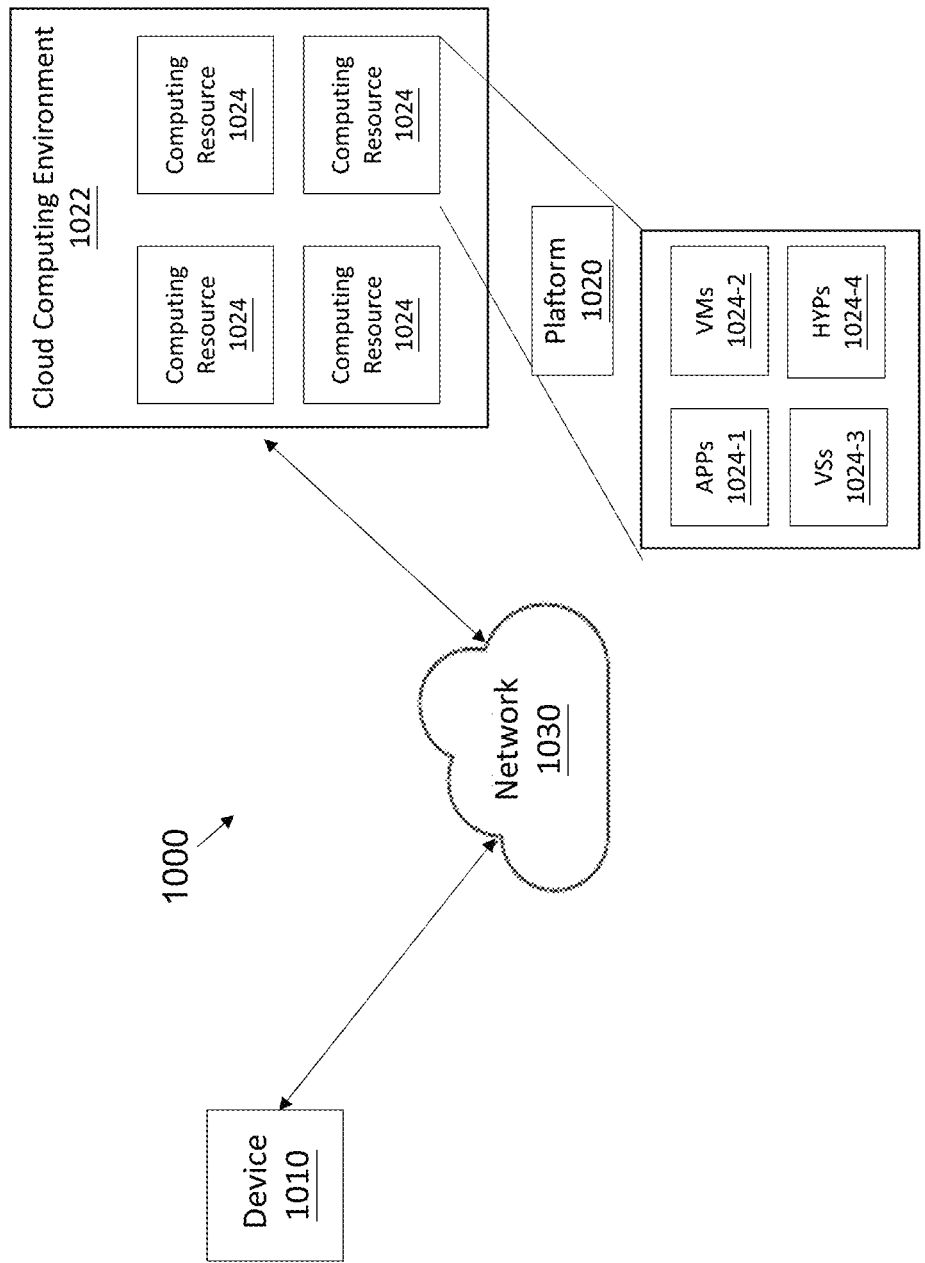
FIG. 10 illustrates a diagram of an example environment in which systems and/or methods, described herein, may be implemented.

FIG. 10 illustrates a diagram of an example environment 1000 in which systems and/or methods, described herein, may be implemented. As shown in FIG. 10, environment 1000 may include a device 1010, a platform 1020, and a network 1030. Devices of environment 1000 may interconnect via wired connections, wireless connections, or a combination of wired and wireless connections. In some embodiments, any of the functions and operations described with reference to FIG. 1A to FIG. 9D above may be performed by any combination of elements illustrated in FIG. 10.

According to embodiments, the information management system described herein may be stored, hosted, or deployed in the cloud computing platform 1020. In this regard, device 1010 may include a device, system, equipment, or the like, utilized by the user (e.g., user of a marketing team, user of a network planning team, etc.) to access the information management system. In that case, device 1010 may include one or more devices capable of receiving, generating, storing, processing, and/or providing information associated with platform 1020. According to embodiments, device 1010 may be part of information utilization party 130 in FIG. 1A. For example, device 1010 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, device 1010 may receive information from and/or transmit information to platform 1020.

Additionally or alternatively, the device 1010 may refer to one or more devices associated with the information resources. In this regard, device 1010 may include any suitable type of equipment, terminal, systems, and platform (e.g., UE, network node, online resources, etc.) as described above, and may communicate with the information management system hosted in the platform 1020.

Platform 1020 includes one or more devices capable of receiving, generating, storing, processing, and/or providing information. In some implementations, platform 1020 may include a cloud server or a group of cloud servers. In some implementations, platform 1020 may be designed to be modular such that certain software components may be swapped in or out depending on a particular need. As such, platform 1020 may be easily and/or quickly reconfigured for different uses.

In some implementations, as shown, platform 1020 may be hosted in cloud computing environment 1022. Notably, while implementations described herein describe platform 1020 as being hosted in cloud computing environment 1022, in some implementations, platform 1020 may not be cloud-based (i.e., may be implemented outside of a cloud computing environment) or may be partially cloud-based.

Cloud computing environment 1022 includes an environment that hosts platform 1020. Cloud computing environment 1022 may provide computation, software, data access, storage, etc. services that do not require end-user (e.g., user device 1010) knowledge of a physical location and configuration of system(s) and/or device(s) that hosts platform 1020. As shown, cloud computing environment 1022 may include a group of computing resources 1024 (referred to collectively as "computing resources 1024" and individually as "computing resource 1024").

Computing resource 1024 includes one or more personal computers, a cluster of computing devices, workstation computers, server devices, or other types of computation and/or communication devices. In some implementations, computing resource 1024 may host platform 1020. The cloud resources may include compute instances executing in computing resource 1024, storage devices provided in computing resource 1024, data transfer devices provided by computing resource 1024, etc. In some implementations, computing resource 1024 may communicate with other computing resources 1024 via wired connections, wireless connections, or a combination of wired and wireless connections.

As further shown in FIG. 10, computing resource 1024 includes a group of cloud resources, such as one or more applications ("APPs") 1024-1, one or more virtual machines ("VMs") 1024-2, virtualized storage ("VSs") 1024-3, one or more hypervisors ("HYPs") 1024-4, or the like.

Application 1024-1 includes one or more software applications that may be provided to or accessed by user device 1010. Application 1024-1 may eliminate a need to install and execute the software applications on user device 1010. For example, application 1024-1 may include software associated with platform 1020 and/or any other software capable of being provided via cloud computing environment 1022. In some implementations, one application 1024-1 may send/receive information to/from one or more other applications 1024-1, via virtual machine 1024-2.

Virtual machine 1024-2 includes a software implementation of a machine (e.g., a computer) that executes programs like a physical machine. Virtual machine 1024-2 may be either a system virtual machine or a process virtual machine, depending upon use and degree of correspondence to any real machine by virtual machine 1024-2. A system virtual machine may provide a complete system platform that supports execution of a complete operating system ("OS"). A process virtual machine may execute a single program, and may support a single process. In some implementations, virtual machine 1024-2 may execute on behalf of a user (e.g., user device 1010), and may manage infrastructure of cloud computing environment 1022, such as data management, synchronization, or long-duration data transfers.

Virtualized storage 1024-3 includes one or more storage systems and/or one or more devices that use virtualization techniques within the storage systems or devices of computing resource 1024. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1024-4 may provide hardware virtualization techniques that allow multiple operating systems (e.g., "guest operating systems") to execute concurrently on a host computer, such as computing resource 1024. Hypervisor 1024-4 may present a virtual operating platform to the guest operating systems, and may manage the execution of the guest operating systems. Multiple instances of a variety of operating systems may share virtualized hardware resources.

Network 1030 may include one or more wired and/or wireless networks. For example, network 1030 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 10 are provided as an example. In practice, there may be additional devices and/or networks, fewer devices and/or networks, different devices and/or networks, or differently arranged devices and/or networks than those shown in FIG. 10. Furthermore, two or more devices shown in FIG. 10 may be implemented within a single device, or a single device shown in FIG. 10 may be implemented as multiple, distributed devices. Additionally, or alternatively, a set of devices (e.g., one or more devices) of environment 1000 may perform one or more functions described as being performed by another set of devices of environment 1000.

VARIOUS ASPECTS OF EMBODIMENTS

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Various further respective aspects and features of embodiments of the present disclosure may be defined by the following items:

Item [1]: A system including: a memory storage storing computer-executable instructions; and at least one processor communicatively coupled to the memory storage, wherein the at least one processor may be configured to execute the instructions to: collect, from a plurality of information resources, information associated with a plurality of networks; determine, based on the collected information, network quality of at least a portion of the plurality of networks; determine whether or not a condition associated with the network quality of the portion of the plurality of networks is satisfied; and based on determining that the condition is satisfied, output information associated with a location at which the condition is satisfied.

Item [2]: The system according to item [1], wherein the collected information may include at least one key performance indicator (KPI) parameter of a first network at a first location and at least one KPI parameter of a second network at the first location.

Item [3]: The system according to item [2], wherein the collected information may further include at least one KPI parameter of the first network at a second location and at least one KPI parameter of the second network at the second location.

Item [4]: The system according to any one of items [2]-[3], wherein the collected information may further include at least one KPI parameter of a third network at the first location.

Item [5]: The system according to any one of items [2]-[4], wherein the KPI parameter may further include at least one of: reference signal received power (RSRP), reference signal received quality (RSRQ), received signal strength indicator (RSSI), and signal to interference and noise ratio (SINR).

Item [6]: The system according to any one of items [2]-[5], wherein the portion of the plurality of networks may include the first network and the second network, and wherein the at least one processor may be configured to execute the instructions to determine the network quality by: determining, based on the at least one KPI parameter of the first network, a quality level of the first network at the first location; and determining, based on the at least one KPI parameter of the second network, a quality level of the second network at the first location.

Item [7]: The system according to item [6], wherein the at least one processor may be configured to execute the instructions to determine whether or not the condition is satisfied by: comparing the quality level of the first network to the quality level of the second network.

Item [8]: The system according to item [7], wherein the condition may include one of: the quality level of the first network being higher than the quality level of the second network; and the quality level of the first network being lower than the quality level of the second network.

Item [9]: The system according to item [8], wherein the at least one processor may be configured to execute the instructions to output the information by: generating at least one graphical user interface (GUI), wherein the GUI comprises a map including an icon representing the first location; and presenting, via a user equipment, the GUI to the user.

Item [10]: A method, performed by at least one processor, including: collecting, from a plurality of information resources, information associated with a plurality of networks; determining, based on the collected information, network quality of at least a portion of the plurality of networks; determining whether or not a condition associated with the network quality of the portion of the plurality of networks is satisfied; and based on determining that the condition is satisfied, outputting information associated with a location at which the condition is satisfied.

Item [11]: The method according to item [10], wherein the collected information may include at least one key performance indicator (KPI) parameter of a first network at a first location and at least one KPI parameter of a second network at the first location.

Item [12]: The method according to item [11], wherein the collected information may further include at least one KPI parameter of the first network at a second location and at least one KPI parameter of the second network at the second location.

Item [13]: The method according to any one of items [11]-[12], wherein the collected information may further include at least one KPI parameter of a third network at the first location.

Item [14]: The method according to any one of items [11]-[13], wherein the KPI parameter may further include at least one of: reference signal received power (RSRP), reference signal received quality (RSRQ), received signal strength indicator (RSSI), and signal to interference and noise ratio (SINR).

Item [15]: The method according to any one of items [11]-[14], wherein the portion of the plurality of networks may include the first network and the second network, wherein the determining the network quality may include: determining, based on the at least one KPI parameter of the first network, a quality level of the first network at the first location; and determining, based on the at least one KPI parameter of the second network, a quality level of the second network at the first location.

Item [16]: The method according to item [15], wherein the determining whether or not the condition is satisfied may include: comparing the quality level of the first network to the quality level of the second network.

Item [17]: The method according to item [16], wherein the condition may include one of: the quality level of the first network being higher than the quality level of the second network; and the quality level of the first network being lower than the quality level of the second network.

Item [18]: The method according to item [17], wherein the outputting the information may include: generating at least one graphical user interface (GUI), wherein the GUI comprises a map including an icon representing the first location; and presenting, via a user equipment, the GUI to the user.

Item [19]: A non-transitory computer-readable recording medium may have recorded thereon instructions executable by at least one processor to cause the at least one processor to perform a method including: collecting, from a plurality of information resources, information associated with a plurality of networks; determining, based on the collected information, network quality of at least a portion of the plurality of networks; determining whether or not a condition associated with the network quality of the portion of the plurality of networks is satisfied; and based on determining that the condition is satisfied, outputting information associated with a location at which the condition is satisfied.

Item [20]: The non-transitory computer-readable recording medium according to item [19], wherein the collected information may include at least one key performance indicator (KPI) parameter of a first network at a first location and at least one KPI parameter of a second network at the first location.

It can be understood that numerous modifications and variations of the present disclosure are possible in light of the above teachings. It will be apparent that within the scope of the appended clauses, the present disclosures may be practiced otherwise than as specifically described herein.

What is claimed is:
1. A system comprising:
a memory storage storing computer-executable instructions; and
at least one processor communicatively coupled to the memory storage, wherein the at least one processor is configured to execute the instructions to:
collect, from a plurality of information resources, information associated with a plurality of networks;
determine, based on the collected information, network quality of at least a portion of the plurality of networks;

determine whether or not a condition associated with the network quality of the portion of the plurality of networks is satisfied; and based on determining that the condition is satisfied, output information associated with a location at which the condition is satisfied, wherein the collected information comprises at least one key performance indicator (KPI) parameter of a first network at a first location and at least one KPI parameter of a second network at the first location, wherein the portion of the plurality of networks comprises the first network and the second network, and wherein the network quality is determined by determining, based on the at least one KPI parameter of the first network, a quality level of the first network at the first location, and determining, based on the at least one KPI parameter of the second network, a quality level of the second network at the first location, wherein the at least one processor is configured to execute the instructions to determine whether or not the condition is satisfied by comparing the quality level of the first network to the quality level of the second network, wherein the output information comprises a graphical user interface (GUI) comprising:
 a first interactive element via which one or more networks are selectable by a user for visualizing a comparison against the first network,
 a second interactive element via which one or more conditions corresponding to the comparison are selectable by the user, and
 a map on which a visual representation of a coverage area of the first network is overlaid, and wherein an icon is displayed at the first location on the map to indicate that the condition is satisfied at the first location, based on (a) the condition being determined to be satisfied at the first location, (b) the second network being selected by the user via the first interactive element, and (c) the condition being selected by the user via the second interactive element.

2. The system according to claim 1, wherein the collected information further comprises at least one KPI parameter of the first network at a second location and at least one KPI parameter of the second network at the second location.

3. The system according to claim 1, wherein the collected information further comprises at least one KPI parameter of a third network at the first location.

4. The system according to claim 1, wherein the KPI parameter comprises at least one of: reference signal received power (RSRP), reference signal received quality (RSRQ), received signal strength indicator (RSSI), and signal to interference and noise ratio (SINR).

5. The system according to claim 1, wherein the condition comprises one of:
 the quality level of the first network being higher than the quality level of the second network; and
 the quality level of the first network being lower than the quality level of the second network.

6. A method, performed by at least one processor, comprising:
 collecting, from a plurality of information resources, information associated with a plurality of networks;
 determining, based on the collected information, network quality of at least a portion of the plurality of networks;
 determining whether or not a condition associated with the network quality of the portion of the plurality of networks is satisfied; and
 based on determining that the condition is satisfied, outputting information associated with a location at which the condition is satisfied, wherein the collected information comprises at least one key performance indicator (KPI) parameter of a first network at a first location and at least one KPI parameter of a second network at the first location, wherein the portion of the plurality of networks comprises the first network and the second network, and wherein the network quality is determined by determining, based on the at least one KPI parameter of the first network, a quality level of the first network at the first location, and determining, based on the at least one KPI parameter of the second network, a quality level of the second network at the first location, wherein the determining whether or not the condition is satisfied comprises: comparing the quality level of the first network to the quality level of the second network, wherein the output information comprises a graphical user interface (GUI) comprising:
 a first interactive element via which one or more networks are selectable by a user for visualizing a comparison against the first network,
 a second interactive element via which one or more conditions corresponding to the comparison are selectable by the user, and
 a map on which a visual representation of a coverage area of the first network is overlaid, and wherein an icon is displayed at the first location on the map to indicate that the condition is satisfied at the first location, based on (a) the condition being determined to be satisfied at the first location, (b) the second network being selected by the user via the first interactive element, and (c) the condition being selected by the user via the second interactive element.

7. The method according to claim 6, wherein the collected information further comprises at least one KPI parameter of the first network at a second location and at least one KPI parameter of the second network at the second location.

8. The method according to claim 6, wherein the collected information further comprises at least one KPI parameter of a third network at the first location.

9. The method according to claim 6, wherein the KPI parameter comprises at least one of: reference signal received power (RSRP), reference signal received quality (RSRQ), received signal strength indicator (RSSI), and signal to interference and noise ratio (SINR).

10. The method according to claim 6, wherein the condition comprises one of:
 the quality level of the first network being higher than the quality level of the second network; and
 the quality level of the first network being lower than the quality level of the second network.

11. A non-transitory computer-readable recording medium having recorded thereon instructions executable by at least one processor to cause the at least one processor to perform a method comprising:
 collecting, from a plurality of information resources, information associated with a plurality of networks;
 determining, based on the collected information, network quality of at least a portion of the plurality of networks;
 determining whether or not a condition associated with the network quality of the portion of the plurality of networks is satisfied; and
 based on determining that the condition is satisfied, outputting information associated with a location at which the condition is satisfied, wherein the collected information comprises at least one key performance indicator (KPI) parameter of a first network at a first location and at least one KPI parameter of a second network at the first location, wherein the portion of the plurality of networks comprises the first network and the second network, and wherein the network quality is determined by determining, based on the at least one KPI parameter of the first network, a quality level of the first network at the first location, and determining, based on the at least one KPI parameter of the second network, a quality level of the second network at the first location, wherein the determining whether or not the condition is satisfied comprises: comparing the quality level of the first network to the quality level of the second network, wherein the output information comprises a graphical user interface (GUI) comprising:

a first interactive element via which one or more networks are selectable by a user for visualizing a comparison against the first network, a second interactive element via which one or more conditions corresponding to the comparison are selectable by the user, and a map on which a visual representation of a coverage area of the first network is overlaid, and wherein an icon is displayed at the first location on the map to indicate that the condition is satisfied at the first location, based on (a) the condition being determined to be satisfied at the first location, (b) the second network being selected by the user via the first interactive element, and (c) the condition being selected by the user via the second interactive element.

* * * * *